(12) United States Patent
Sawant et al.

(10) Patent No.: US 11,394,692 B2
(45) Date of Patent: *Jul. 19, 2022

(54) DISTRIBUTED TUNNELING FOR VPN

(71) Applicant: Nicira, Inc., Palo Alto, CA (US)

(72) Inventors: Sandesh Sawant, Pune (IN); Amit Chopra, Palo Alto, CA (US); Vinayak Shashikant Naik, Pune (IN); Jayant Jain, Cupertino, CA (US); Anirban Sengupta, Saratoga, CA (US); Uday Masurekar, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/785,639

(22) Filed: Feb. 9, 2020

(65) Prior Publication Data
US 2020/0177555 A1 Jun. 4, 2020

Related U.S. Application Data

(63) Continuation of application No. 15/140,027, filed on Apr. 27, 2016, now Pat. No. 10,567,347, which is a (Continued)

(30) Foreign Application Priority Data

Feb. 12, 2016 (IN) .............................. 201641005073

(51) Int. Cl.
*H04L 9/40* (2022.01)
*H04L 12/46* (2006.01)
(Continued)

(52) U.S. Cl.
CPC ...... *H04L 63/0272* (2013.01); *G06F 9/45558* (2013.01); *H04L 9/083* (2013.01);
(Continued)

(58) Field of Classification Search
CPC . H04L 63/0272; H04L 9/083; H04L 12/4633; H04L 63/0428; H04L 63/061;
(Continued)

(56) References Cited

U.S. PATENT DOCUMENTS 5,268,962 A 12/1993 Abadi et al.
6,738,910 B1 5/2004 Genty et al.
(Continued)

FOREIGN PATENT DOCUMENTS

CN 1350382 A 5/2002
CN 101409619 A 4/2009
(Continued)

OTHER PUBLICATIONS

Cheswick, William R., et al., "Tunneling and VPNs," Firewalls and Internet Security: Repelling the Wily Hacker (Second Edition), Mar. 6, 2003, 19 pages, Addison-Wesley Professional, USA.

Primary Examiner — Shahriar Zarrineh
(74) Attorney, Agent, or Firm — Adeli LLP

(57) ABSTRACT

A novel method of providing virtual private access to a software defined data center (SDDC) is provided. The SDDC uses distributed VPN tunneling to allow external access to application services hosted in the SDDC. The SDDC includes host machines for providing computing and networking resources and a VPN gateway for providing external access to those resources. The host machines that host the VMs running the applications that VPN clients are interested in connecting performs the VPN encryption and decryption. The VPN gateway does not perform any encryption and decryption operations. The packet structure is such that the VPN gateway can read the IP address of the VM without decrypting the packet.

10 Claims, 20 Drawing Sheets

Related U.S. Application Data continuation-in-part of application No. 14/815,074, filed on Jul. 31, 2015, now Pat. No. 10,044,502.

(51) Int. Cl.

| | | |
|---|---|---|
| H04L 9/08 | (2006.01) | |
| G06F 9/455 | (2018.01) | |
| H04L 67/1097 | (2022.01) | |
| H04L 45/74 | (2022.01) | |
| H04L 69/14 | (2022.01) | |

(52) U.S. Cl.
CPC ...... *H04L 12/4633* (2013.01); *H04L 63/0428* (2013.01); *H04L 63/061* (2013.01); *G06F 2009/45595* (2013.01); *H04L 45/74* (2013.01); *H04L 67/1097* (2013.01); *H04L 69/14* (2013.01)

(58) Field of Classification Search
CPC ..... H04L 45/74; H04L 67/1097; H04L 69/14; G06F 9/45558; G06F 2009/45595
USPC .......................................................... 713/160
See application file for complete search history.

(56) References Cited

U.S. PATENT DOCUMENTS

| | | | |
|---|---|---|---|
| 6,959,090 B1* | 10/2005 | Alve ................ | H04N 5/913 |
| | | | 348/E5.007 |
| 7,055,027 B1 | 5/2006 | Gunter et al. | |
| 7,127,608 B2* | 10/2006 | Royer ................ | H04L 67/14 |
| | | | 713/168 |
| 7,165,175 B1 | 1/2007 | Kollmyer et al. | |
| 7,376,831 B2* | 5/2008 | Kollmyer ......... | H04L 63/0428 |
| | | | 348/E7.056 |
| 7,380,124 B1 | 5/2008 | Mizell et al. | |
| 7,685,317 B2 | 3/2010 | Iyer | |
| 7,900,250 B1 | 3/2011 | Fedyk et al. | |
| 8,037,530 B1* | 10/2011 | Fink ................ | H04L 9/0841 |
| | | | 713/153 |
| 8,098,656 B2 | 1/2012 | Lapuh et al. | |
| 8,295,306 B2* | 10/2012 | Bagepalli ............. | H04L 69/161 |
| | | | 370/469 |
| 8,417,868 B2* | 4/2013 | Gupta .............. | H04L 63/0485 |
| | | | 711/2 |
| 8,583,913 B1* | 11/2013 | Gabrielson ......... | H04L 63/0281 |
| | | | 713/153 |
| 8,781,502 B1 | 7/2014 | Middleton et al. | |
| 8,837,491 B2* | 9/2014 | Huynh Van ......... | H04L 12/4641 |
| | | | 370/395.31 |
| 8,880,870 B2* | 11/2014 | Aizawa ............. | H04L 9/3273 |
| | | | 713/153 |
| 9,116,727 B2* | 8/2015 | Benny ................. | G06F 9/455 |
| 9,164,795 B1* | 10/2015 | Vincent ............. | H04L 12/4633 |
| 9,246,876 B1 | 1/2016 | Melam et al. | |
| 9,559,896 B2* | 1/2017 | Patwardhan ........ | H04L 41/0803 |
| 9,660,905 B2* | 5/2017 | Dunbar ............. | H04L 45/64 |
| 9,699,030 B1 | 7/2017 | Kumar | |
| 10,044,502 B2 | 8/2018 | Jain et al. | |
| 10,523,426 B2 | 12/2019 | Jain et al. | |
| 10,567,347 B2 | 2/2020 | Sawant et al. | |
| 10,581,737 B1* | 3/2020 | Allen ................ | G06F 9/45558 |
| 2002/0042875 A1 | 4/2002 | Shukla | |
| 2002/0169980 A1 | 11/2002 | Brownell | |
| 2003/0018889 A1* | 1/2003 | Burnett ............. | H04L 41/0809 |
| | | | 713/153 |
| 2003/0079121 A1 | 4/2003 | Gilman et al. | |
| 2003/0093691 A1 | 5/2003 | Simon et al. | |
| 2003/0128696 A1* | 7/2003 | Wengrovitz ......... | H04L 65/103 |
| | | | 370/352 |
| 2003/0140131 A1 | 7/2003 | Chandrashekhar et al. | |
| 2004/0017796 A1 | 1/2004 | Lemieux et al. | |
| 2004/0143758 A1 | 7/2004 | Swander et al. | |
| 2004/0225895 A1 | 11/2004 | Mukherjee et al. | |
| 2005/0021949 A1 | 1/2005 | Izawa et al. | |
| 2006/0090074 A1 | 4/2006 | Matoba | |
| 2007/0104202 A1* | 5/2007 | Tariq ................ | H04L 63/08 |
| | | | 709/245 |
| 2008/0075088 A1 | 3/2008 | Carrasco | |
| 2008/0127327 A1* | 5/2008 | Carrasco ............ | H04L 63/0272 |
| | | | 726/15 |
| 2008/0307519 A1 | 12/2008 | Curcio et al. | |
| 2009/0059837 A1 | 3/2009 | Kurk et al. | |
| 2009/0059957 A1* | 3/2009 | Bagepalli ............. | H04L 63/205 |
| | | | 370/469 |
| 2009/0222892 A1 | 9/2009 | Ueno | |
| 2010/0031036 A1* | 2/2010 | Chauncey ........... | H04W 12/033 |
| | | | 713/168 |
| 2010/0034207 A1 | 2/2010 | McGrew et al. | |
| 2010/0077204 A1 | 3/2010 | Kawano | |
| 2011/0185398 A1 | 7/2011 | Kubota | |
| 2011/0314274 A1* | 12/2011 | Swartz ................. | H04L 63/164 |
| | | | 713/160 |
| 2012/0039337 A1 | 2/2012 | Jackowski et al. | |
| 2012/0096269 A1 | 4/2012 | McAlister | |
| 2013/0054763 A1 | 2/2013 | Merwe et al. | |
| 2013/0227673 A1 | 8/2013 | Yoon | |
| 2013/0266019 A1 | 10/2013 | Qu et al. | |
| 2013/0287022 A1 | 10/2013 | Banavalikar et al. | |
| 2013/0322453 A1 | 12/2013 | Allan | |
| 2014/0025948 A1* | 1/2014 | Bestler ............... | H04L 9/0863 |
| | | | 713/167 |
| 2014/0082719 A1 | 3/2014 | Persson et al. | |
| 2014/0086253 A1* | 3/2014 | Yong ................. | H04L 45/50 |
| | | | 370/395.53 |
| 2014/0112349 A1 | 4/2014 | Moreno et al. | |
| 2014/0115325 A1 | 4/2014 | Detienne et al. | |
| 2014/0153572 A1 | 6/2014 | Hampel et al. | |
| 2014/0156818 A1 | 6/2014 | Hunt | |
| 2014/0169215 A1* | 6/2014 | Rajendran ............ | H04L 49/70 |
| | | | 370/254 |
| 2014/0208317 A1 | 7/2014 | Nakagawa | |
| 2014/0275851 A1* | 9/2014 | Amble ............... | A61B 6/032 |
| | | | 600/509 |
| 2014/0282817 A1* | 9/2014 | Singer ................ | H04L 63/08 |
| | | | 726/1 |
| 2014/0294018 A1 | 10/2014 | Sung et al. | |
| 2014/0376550 A1 | 12/2014 | Khan et al. | |
| 2014/0380038 A1* | 12/2014 | Wilson ............... | H04L 63/0471 |
| | | | 713/151 |
| 2015/0003458 A1 | 1/2015 | Li et al. | |
| 2015/0003463 A1 | 1/2015 | Li et al. | |
| 2015/0009992 A1 | 1/2015 | Zhang | |
| 2015/0023357 A1 | 1/2015 | Imai | |
| 2015/0026459 A1* | 1/2015 | Divakar ............ | H04N 21/23476 |
| | | | 713/160 |
| 2015/0063363 A1 | 3/2015 | Bemmel | |
| 2015/0082418 A1 | 3/2015 | Gu | |
| 2015/0103842 A1* | 4/2015 | Chandrashekhar ..... | H04L 45/44 |
| | | | 370/409 |
| 2015/0124820 A1 | 5/2015 | Attar et al. | |
| 2015/0124822 A1 | 5/2015 | Chu et al. | |
| 2015/0124823 A1 | 5/2015 | Pani et al. | |
| 2015/0124828 A1 | 5/2015 | CJ et al. | |
| 2015/0146733 A1 | 5/2015 | Haney | |
| 2015/0188823 A1* | 7/2015 | Williams ............ | H04L 63/0272 |
| | | | 370/235 |
| 2015/0188888 A1* | 7/2015 | Kang ................. | H04L 63/0272 |
| | | | 726/12 |
| 2015/0188943 A1 | 7/2015 | Williams et al. | |
| 2015/0244617 A1 | 8/2015 | Nakil et al. | |
| 2015/0280928 A1 | 10/2015 | Tessmer et al. | |
| 2015/0280961 A1 | 10/2015 | Akune et al. | |
| 2015/0281099 A1 | 10/2015 | Banavalikar | |
| 2015/0358232 A1 | 12/2015 | Chen et al. | |
| 2015/0372928 A1 | 12/2015 | Basilier et al. | |
| 2015/0381386 A1 | 12/2015 | Sigoure et al. | |
| 2016/0094365 A1 | 3/2016 | Subramaniyam et al. | |
| 2016/0105392 A1 | 4/2016 | Thakkar et al. | |
| 2016/0149804 A1 | 5/2016 | Mirza | |
| 2016/0210209 A1 | 7/2016 | Verkaik et al. | |
| 2016/0226755 A1 | 8/2016 | Hammam et al. | |

(56) References Cited

U.S. PATENT DOCUMENTS

| | | |
|---|---|---|
| 2016/0241515 A1 | 8/2016 | Pai et al. |
| 2016/0253198 A1 | 9/2016 | Gallant et al. |
| 2016/0352632 A1 | 12/2016 | Nedeltchev et al. |
| 2016/0352633 A1 | 12/2016 | Kapadia et al. |
| 2016/0359811 A1 | 12/2016 | Chan et al. |
| 2016/0380893 A1 | 12/2016 | Chopra et al. |
| 2016/0381015 A1 | 12/2016 | Ravinutala et al. |
| 2017/0005923 A1 | 1/2017 | Babakian |
| 2017/0024260 A1 | 1/2017 | Chandrasekaran et al. |
| 2017/0026233 A1 | 1/2017 | Boutros et al. |
| 2017/0026355 A1 | 1/2017 | Mathaiyan et al. |
| 2017/0026417 A1* | 1/2017 | Ermagan ............ H04L 63/0272 |
| 2017/0033924 A1 | 2/2017 | Jain et al. |
| 2017/0034129 A1 | 2/2017 | Sawant et al. |
| 2017/0085502 A1 | 3/2017 | Biruduraju |
| 2017/0163569 A1 | 6/2017 | Koganti |
| 2017/0164142 A1* | 6/2017 | Rykowski ............. H04W 12/06 |
| 2017/0170989 A1 | 6/2017 | Sridhar et al. |
| 2018/0062992 A1 | 3/2018 | Cohn et al. |
| 2018/0109503 A1* | 4/2018 | Nádas ................. H04L 63/0457 |
| 2018/0131775 A1 | 5/2018 | Devarajan et al. |
| 2018/0375646 A1 | 12/2018 | Jain et al. |
| 2019/0014040 A1 | 1/2019 | Yerrapureddy et al. |

FOREIGN PATENT DOCUMENTS

| | | | |
|---|---|---|---|
| JP | 2014023100 A * | 2/2014 | |
| WO | WO-0207378 A1 * | 1/2002 | ......... H04L 63/0245 |
| WO | WO-2009066302 A2 * | 5/2009 | ............. H04L 12/58 |
| WO | 2010098914 A1 | 9/2010 | |
| WO | 2017023706 A1 | 2/2017 | |

\* cited by examiner

DISTRIBUTED TUNNELING FOR VPN

CLAIM OF BENEFIT TO PRIOR APPLICATIONS

This application is a continuation application of U.S. patent application Ser. No. 15/140,027, filed Apr. 27, 2016, now published as U.S. Patent Publication 2017/0034129. U.S. patent application Ser. No. 15/140,027 claims the benefit of Indian Patent Application No. 201641005073, filed Feb. 12, 2016. U.S. patent application Ser. No. 15/140,027 is also a Continuation In Part application of U.S. patent application Ser. No. 14/815,074, filed Jul. 31, 2015, now issued as U.S. Pat. No. 10,044,502. Indian Patent Application No. 201641005073. U.S. patent application Ser. No. 14/815,074, now issued as U.S. Pat. No. 10,044,502, and U.S. patent application Ser. No. 15/140,027, now published as U.S. Patent Publication 2017/0034129 are incorporated herein by reference.

BACKGROUND

When a user accesses application services hosted in a software defined data center (SDDC) using a mobile device over a public network such as Internet, the data traffic needs to be secured end-to-end with the help of a secure channel such as through virtual private network (VPN). The mobile device communicates with an application server running inside a VM hosted on a hypervisor within the enterprise's data center. The gateway of the data center on the data path between the remote mobile device and the application server typically act as the VPN server. A VPN server typically performs encryption and decryption for VPN channels to and from VMs within the data center. As VPN encryption and decryption are time consuming operations, VPN server can become performance bottleneck.

SUMMARY

Some embodiments provide a SDDC that uses distributed VPN tunneling to allow external access to application services hosted in the SDDC. The SDDC includes host machines for providing computing and networking resources and a VPN gateway for providing external access to those resources. Some embodiments perform VPN operations in the host machines that host the VMs running the applications that VPN clients are interested in connecting. In some embodiments, the VPN gateway does not perform any encryption and decryption operations. In some embodiments, the packet structure is such that the VPN gateway can read the IP address of the VM without decrypting the packet.

Some embodiments use Distributed Network Encryption (DNE) to establish a shared key for VPN encryption. DNE is a mechanism for distributed entities in a data center to share a key. The key management is done centrally from an entity called DNE Key Manager, which communicates with DNE Agents in the hypervisors using a secure control channel. The keys are synced between the Agents, which can work then onwards without requiring the DNE Key Manager to be online.

In some embodiments, when a packet is generated by an application at a VPN client, the VPN client encrypts the packet with VPN encryption key and processes the packet into an IPSec packet with IPSec header. The IPSec packet is then sent through the Internet to the VPN gateway of the datacenter, with the content of the packet encrypted. The VPN gateway of the data center then tunnels the packet to its destination tunnel endpoint (a host machine) by encapsulating it (under overlay such as VXLAN). The host machine that receives the tunnel packet in turn de-capsulate the packet, decrypt the packet, and forward the decrypted data to the destination VM/application.

In some embodiments, a VPN gateway does not perform VPN encryption or decryption. When the VPN gateway receives an encrypted VPN packet over the Internet, it identifies the destination tunnel endpoint (i.e., destination host machine) and the destination VM without decrypting the packet. In some embodiments, the VPN gateway uses information in the IP header to identify destination host machine and destination VM, and the VPN client leaves the IP header unencrypted. In some embodiments, the VPN client encrypt the IP header along with the payload of the packet, but replicates certain portion or fields (e.g., destination IP) of the IP header in an unencrypted portion of the packet so the VPN gateway would be able to forward the packet to its destination in the data center.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a SDDC that uses distributed VPN tunneling to allow external access to application services hosted in the SDDC. The SDDC includes host machines for providing computing and networking resources and a VPN gateway for providing external access to those resources. Some embodiments perform VPN operations in the host machines that host the VMs running the applications that VPN clients are interested in connecting. In some embodiments, the VPN gateway does not perform any encryption and decryption operations. In some embodiments, the packet structure is such that the VPN gateway can read the IP address of the VM without decrypting the packet.

I. Distributed VPN Tunneling

Figure 1:
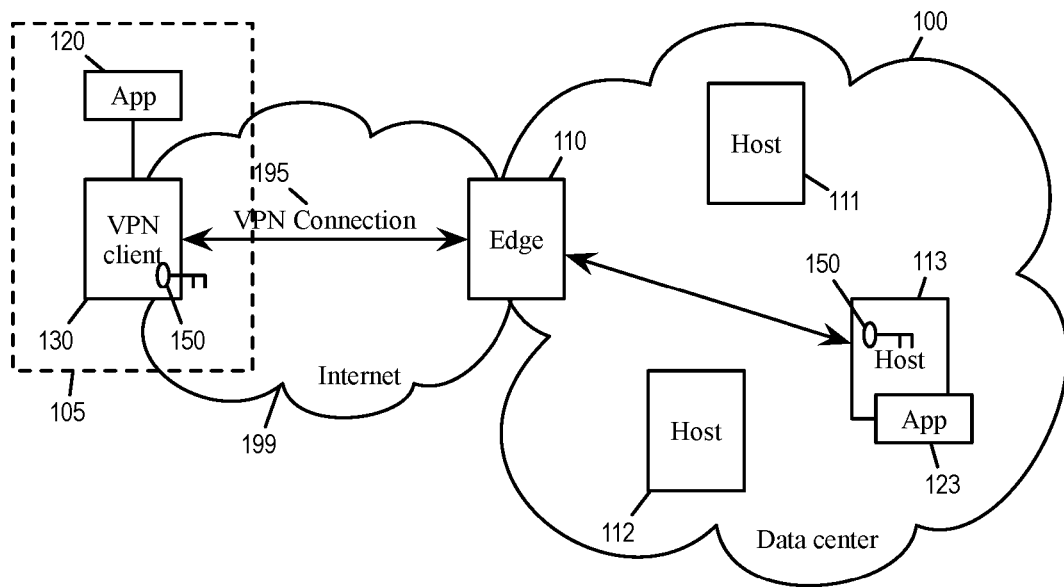
FIG. 1 illustrates a datacenter that provides VPN services to allow external access to its internal resources.
Figure 1:
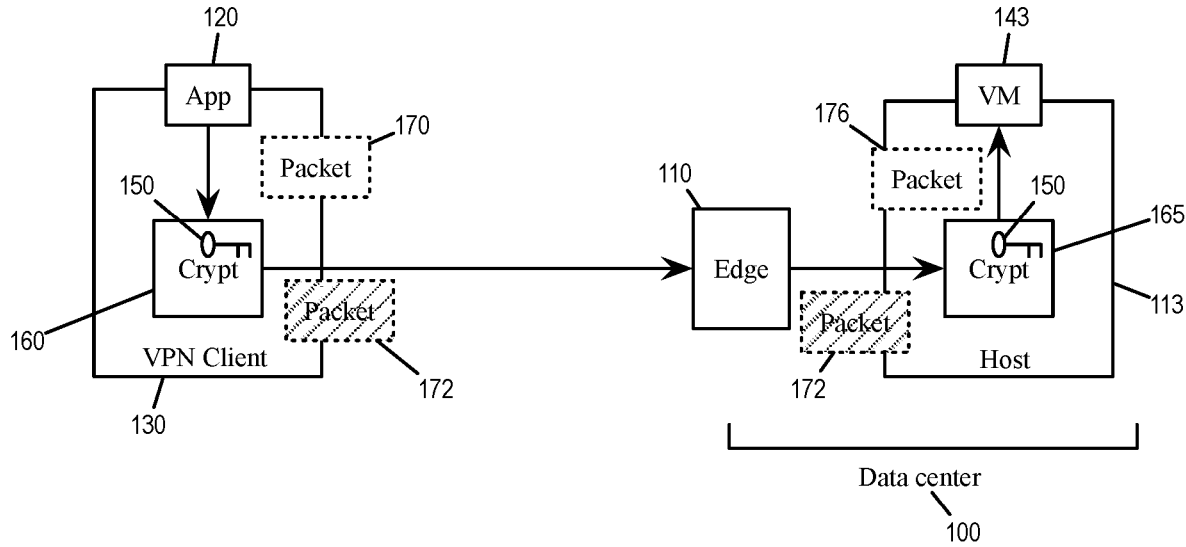

For some embodiments, FIG. 1 illustrates a datacenter 100 that provides VPN services to allow external access to its internal resources. The datacenter 100 is a SDDC that provides computing and/or networking resources to tenants or clients. The computing and/or network resources of the SDDC are logically organized into logical networks for different tenants, where the computing and networking resources are accessible or controllable as network nodes of these logical networks. In some embodiments, some of the computing and network resources of the SDDC are provided by computing devices that serve as host machines for virtual machines (VMs). These VMs in turn perform various operations, including running applications for tenants of the datacenter. As illustrated, the datacenter 100 includes host machines 111-113. The host machine 113 in particular is hosting a VM that is running an application 123. The datacenter 100 also has an edge node 110 for providing edge services and for interfacing the external world through the Internet 199. In some embodiments, a host machine in the datacenter 100 is operating a VM that implements the edge node 110. (Computing devices serving as host machines will be further described by reference to FIG. 18 below.)

Devices external to the datacenter 100 can access the resources of the datacenter (e.g., by appearing as a node in a network of the datacenter 100) by using the VPN service provided by the datacenter 100, where the edge 110 is serving as the VPN gateway (or VPN server) for the datacenter 100. In the illustrated example, a device 105 external to the datacenter 100 is operating an application 120. Such a device can be a computer, a smart phone, other types of mobile devices, or any other device capable of secure data communicating with the datacenter. The application 120 is in VPN communication with the datacenter 100 over the Internet.

The VPN communication is provided by a VPN connection 195 established over the Internet between a VPN client 130 and the edge node 110. The VPN connection 195 allows the application 120 to communicate with the application 123, even though the application 120 is running on a device external to the datacenter 100 while the application 123 is running on a host machine internal to the datacenter 100. The VPN connection 195 is a secured, encrypted connection over the Internet 199. The encryption protects the data traffic over the Internet 199 when it travels between the VPN client 130 and the edge 110.

In some embodiments, an edge node (such as 110) of the data center serves as a VPN gateway/VPN server to allow external networks or devices to connect into the SDDC via a tunneling mechanism over SSL/DTLS or IKE/IPSec. In some embodiments, the VPN server has a public IP address facing the Internet and a private IP address facing the datacenter. In some embodiments, the VPN server in a SDDC is a software appliance (e.g., a VM running on a host machine) rather than a hardware network appliance.

The encryption of the VPN connection 195 is based on a key 150 that is negotiated by the edge 110 and the VPN client 130. In some embodiments, the edge negotiates such a key based on the security policies that is applicable to the data traffic (e.g., based on the flow/L4 connection of the packets, or based on L2 segment/VNI of the packets). The VPN client 130 uses this key 150 to encrypt and decrypt data to and from the VPN connection 195 for the application 120. Likewise, the host machine 113 uses the key 150 to encrypt and decrypt data to and from the VPN connection 195 for the application 123. As illustrated, the application 120 produces a packet 170. A crypto engine 160 in the VPN client 130 encrypts the packet 170 into an encrypted packet 172 by using the encryption key 150. The encrypted packet 172 travels through the Internet to reach the edge 110 of the datacenter 100. The edge 110 forwards the encrypted packet 172 to the host machine 113 by e.g., routing and/or encapsulating the encrypted packet. The host machine 113 has a crypto engine 165 that uses the encryption key 150 to decrypt the routed encrypted packet 172 into a decrypted packet 176 for the VM 143, which is running the application 123. In some embodiments, the crypto engine 165 is a module or function in the virtualization software/hypervisor of the host machine.

It is worth emphasizing that the encryption and the decryption of traffic across VPN connection is conducted near the true endpoint of the VPN traffic, rather than by the edge node that negotiated the encryption key of the VPN connection. In the example of FIG. 1, the true endpoint of the VPN traffic across the VPN connection 195 are application 120 and the application 123. The application 123 is running on the host machine 113, and the encryption/decryption is handled at the host machine 113 rather than at the edge node 110 (which negotiated the encryption key 150). In some embodiments, the machines in the datacenter are operating virtualization software (or hypervisors) in order to operate virtual machines, and the virtualization software running on a host machine handles the encryption and the decryption of the VPN traffic for the VMs of the host machine. Having encryption/decryption handled by the host machines rather than by the edge has the advantage of freeing the edge node from having to perform encryption and decryption for all VPN traffic in and out of the datacenter. Performing end-to-end VPN encryption/decryption also provides higher level of security than performing encryption/decryption at the edge because the VPN packets remain encrypted from the edge all the way to the host machine (and vice versa).

FIG. 1 illustrates a VPN connection that is established between a datacenter's edge node and a VPN client. In some embodiments, a computing device that is running an application that requires VPN access to a datacenter also operates the VPN client in order for the application to gain VPN access into the datacenter. In the example of FIG. 1, the computing device 105 external to the datacenter 100 is operating the VPN client 130 as well as the application 120 in order to establish the VPN connection 195. In some embodiments, a physical device separate from the computing device 105 provides the VPN client functionality. In either instance, a computing device operating a VPN client is referred to as a VPN client device in some embodiments.

In some embodiments, a datacenter is deployed across multiple sites in separate physical locales, and these different sites are communicatively interlinked through the Internet. In some embodiments, each physical site is regarded as a datacenter and the different datacenters or sites are interlinked through the Internet to provide a multi-site environment. Some embodiments use VPN communications to conduct traffic securely between the different sites through the Internet. In some embodiments, each of the sites has an edge node interfacing the Internet, and the VPN connection between the different sites are encrypted by encryption keys negotiated between the edge nodes of different sites. The host machines in those sites in turn use the negotiated keys to encrypt and/or decrypt the data for VPN communications.

Figure 2:
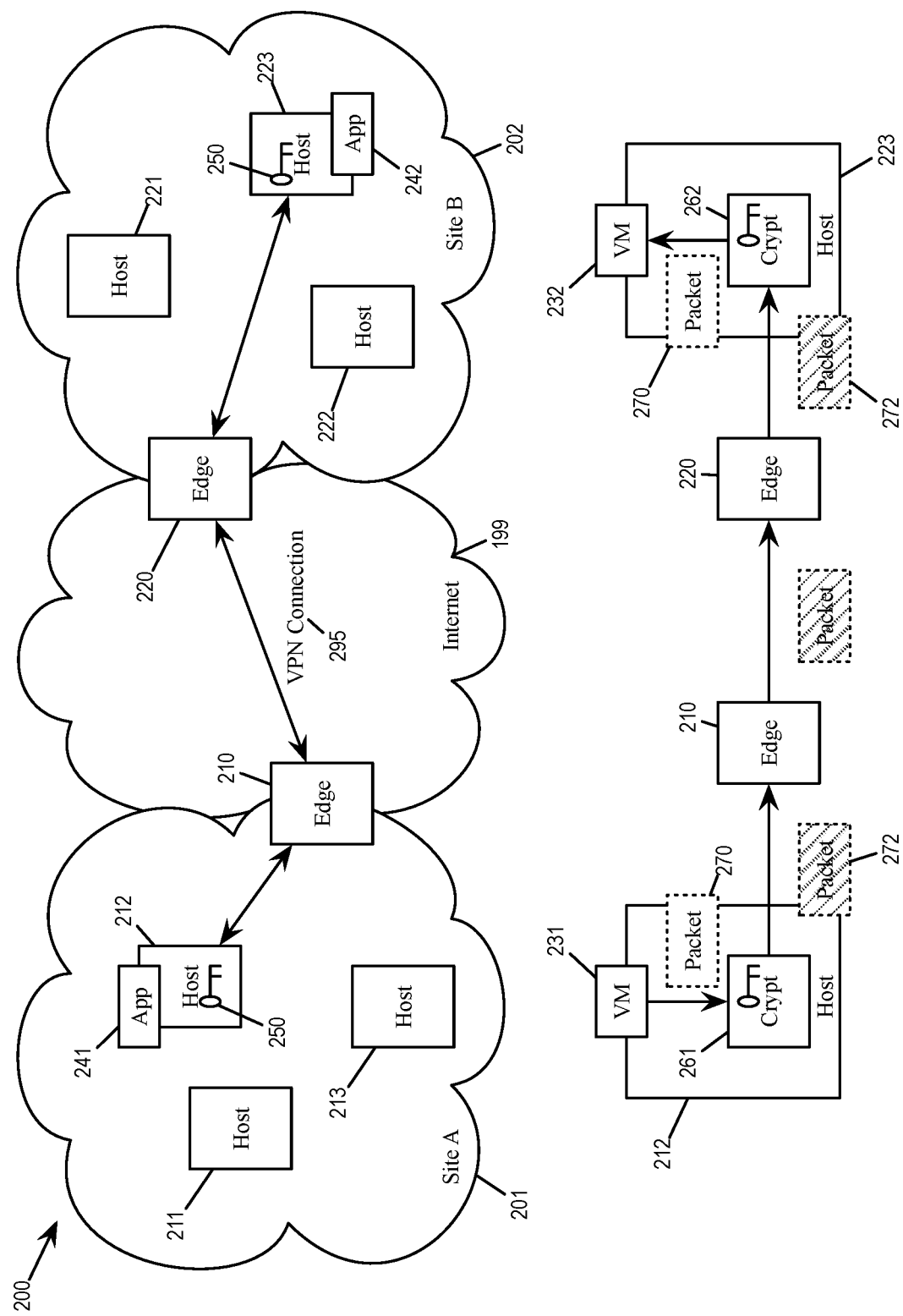
FIG. 2 illustrates a VPN connection between different sites in a multi-site environment.

FIG. 2 illustrates distributed VPN tunneling between different sites in a multi-site environment 200 (or multi-site datacenter). The multi-site environment 200 includes two sites 201 and 202 (site A and site B). The site 201 has host machines 211-213 and an edge node 210 for interfacing the Internet 199. The site 202 includes host machines 221-223 and an edge node 220 for interfacing the Internet 199. The edge nodes 210 and 220 serve as the VPN gateways for their respective sites.

The host machine 212 of site A is running an application 241 and the host machine 223 is running an application 242. The application 241 and the application 242 communicates with each other through a VPN connection 295 as the two applications 241 and 242 are running in different sites separated by the Internet 199. The VPN connection sends traffic that are encrypted by a key 250, which is the VPN encryption key negotiated between the edge 210 and the edge 220. Although the edge nodes 210 and 220 negotiated the key 250 for the VPN connection 295, the key 250 is provided to the host machines 212 and 223 so those host machines can perform the encryption/decryption for the VPN connection near the endpoints of the traffic (i.e., the applications 241 and 242).

As illustrated, a VM 231 of the host machine 212 produces a packet 270 (for the application 241). A crypto engine 261 in the host machine 212 encrypts the packet 270 into an encrypted packet 272 by using the encryption key 250. The host machine 212 forwards the encrypted packet 272 to the edge 210 of the site 201 by e.g., routing and/or encapsulating the packet. The edge 210 of site A in turn sends the encrypted packet 272 to the edge 220 of site B through the Internet (by e.g., using IPSec tunnel). The edge 220 forwards the encrypted packet 272 to the host machine to the host machine 223 by e.g., routing and/or encapsulating the encrypted packet. The host machine 223 has a crypto engine 262 that uses the encryption key 250 to decrypt the encrypted packet 272 into a decrypted packet 276 for a VM 232, which is running the application 223.

By performing VPN encryption/decryption at the host machines rather than at the edge, a datacenter or site is effectively implementing a distributed VPN system in which the tasks of implementing a VPN connection is distributed to the host machines from the edge node. In some embodiments, a site or datacenter has multiple edge nodes, and the VPN traffic to and from this site is further distributed among the different edge nodes.

Figure 3:
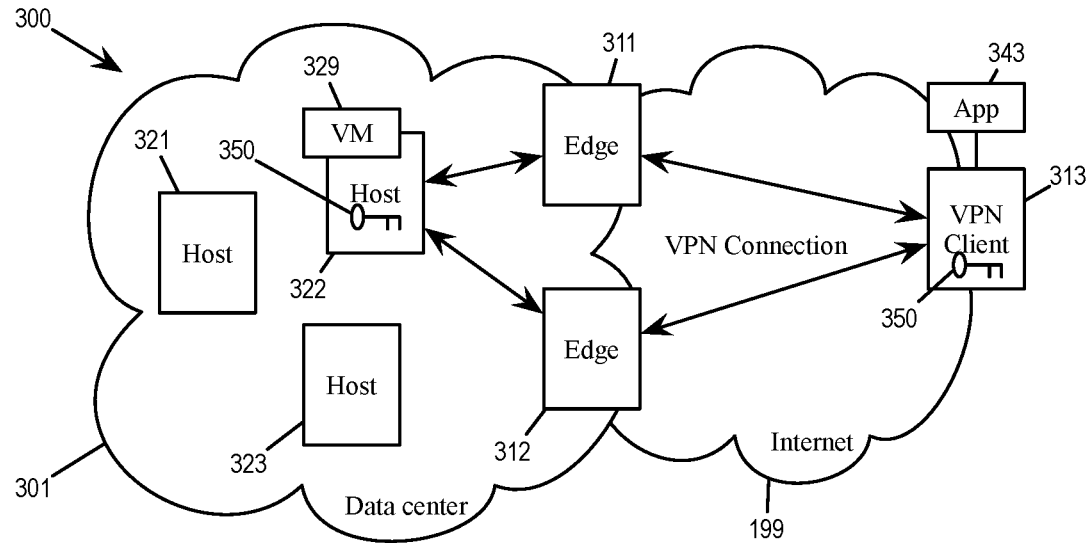
FIG. 3 illustrates the distribution of VPN traffic among multiple edge nodes in and out of a datacenter.
Figure 3:
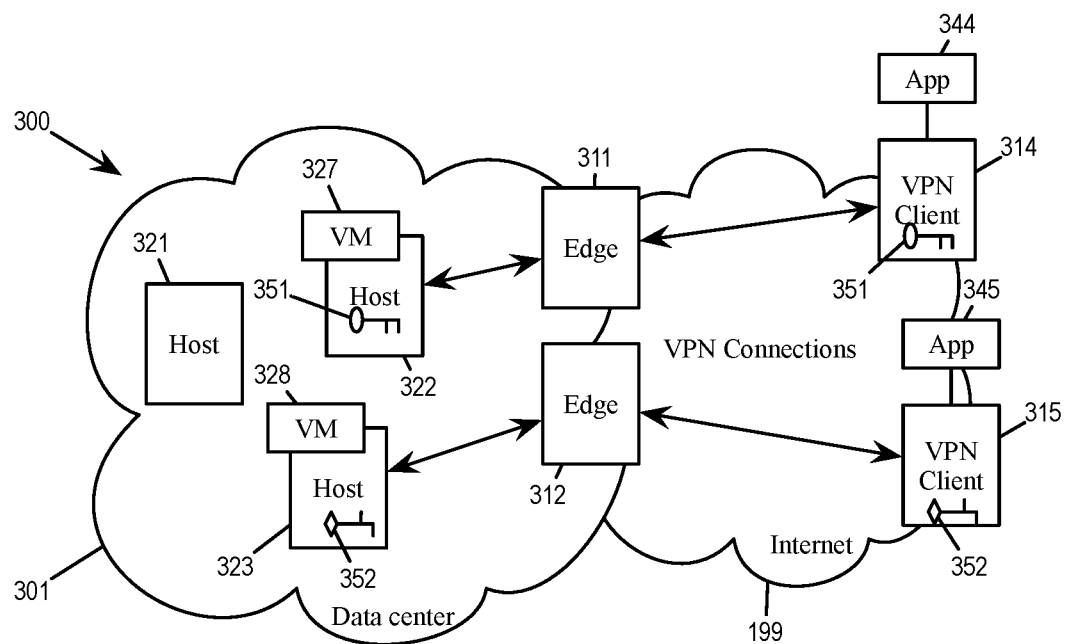

FIGS. 3a-b illustrates the distribution of VPN traffic among multiple edge nodes in and out of a site/datacenter. The figure illustrates a data center 301, which can be a site in a multi-site environment. The data center 301 has edge nodes 311 and 312 as well as host machines 321-323. Both edge nodes 311 and 312 are serving as VPN gateways for the data center 301. In some embodiments, traffic of one VPN connection can be distributed across multiple VPN gateways.

FIG. 3a illustrates the two edge nodes 311 and 312 jointly serving one VPN connection between a VPN client 313 and a host machine 322. As illustrated, the host machine 322 is operating a VM 329 and the VPN client is 313 is running an application 343. The packet traffic between the VM 329 and the application 343 can flow through either the edge node 311 or 312. Both the VPN client 313 and the host machine 322 use the same key 350 to encrypt and decrypt traffic, while the edge nodes 311 and 312 do not perform any encryption or decryption.

In some embodiments, different edge gateways can serve different VPN connections. FIG. 3b illustrates the two edge nodes 311 and 312 serving two different VPN connections for two different VPN clients 314 and 315. As illustrated, there is a first VPN connection between the host machine 322 and a VPN client 314 and a second VPN connection between the host machine 323 and a VPN client 315. The first VPN connection uses the edge node 311 to conduct traffic between the application 344 and the VM 327, while the second VPN connection uses the edge node 312 to conduct traffic between the application 345 and the VM 328. These two VPN connections use different keys 351 and 352 to encrypt and decrypt traffic. The host machine 322 and the VPN client 314 use the key 351 to perform the encryption and decryption of the VPN connection between the VM 327 and the App 344. The host machine 323 and the VPN client 315 use the key 352 to perform the encryption and decryption of the VPN connection between the VM 328 and the App 345.

Figure 4:
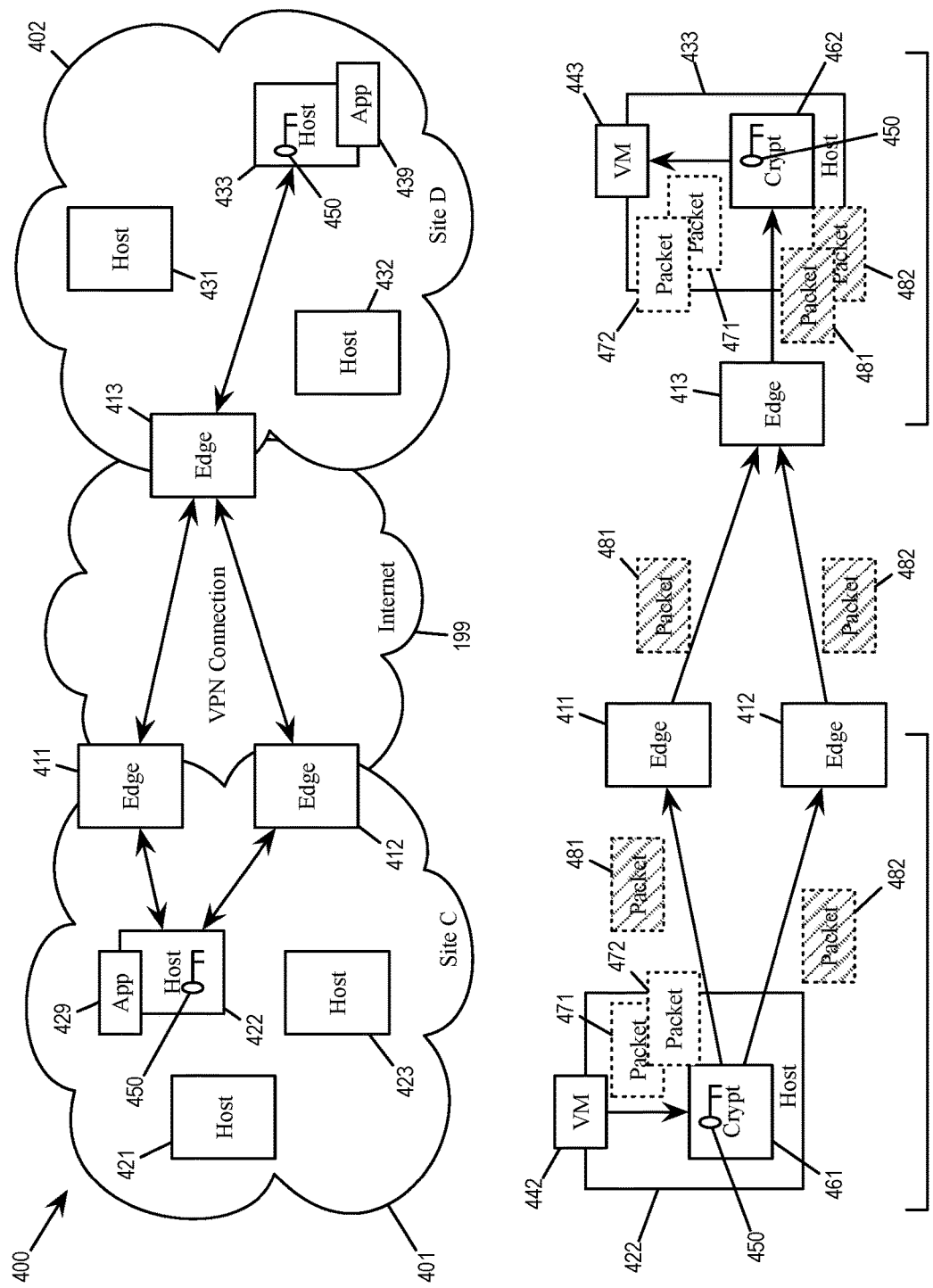
FIG. 4 illustrates the distribution of VPN traffic among multiple edge nodes between datacenters.

FIG. 4 illustrates the distribution of VPN traffic among multiple edge nodes between multiple data centers. The figure illustrates a multi-site environment 400 having sites 401 (site C) and 402 (site D). Site C has edge nodes 411 and 412 as well as host machines 421-423. Site D has an edge node 413 and host machines 431-433. The edge node 413 is serving as the VPN gateway for the site 402. Both edge nodes 411 and 412 are serving as VPN gateways for the site 401.

The host machine 422 of site C and the host machine 433 of site D are in VPN communication with each other for an application 429 running on the host machine 422 and an application 439 running in the host machine 433. The encryption/decryption of the VPN traffic is performed by the host machines 422 and 433 and based on a key 450 that is negotiated between the edge nodes 411, 412 and 413. The encrypted VPN traffic entering and leaving site D is only through the edge node 413, while the same traffic entering and leaving site C is distributed among the edge nodes 411 and 412.

As illustrated, a VM 442 running on the host machine 422 of site C generates packets 471 and 472 for the application 429. A crypto engine 461 of the host machine 422 encrypts these two packets into encrypted packets 481 and 482 using the encryption key 450. The encrypted packet 481 exits site C through the edge 411 into the Internet while the encrypted packet 482 exits site C through the edge 412 into the Internet. Both the encrypted packet 481 and 482 reaches site D through the edge 413, which forwards the encrypted packet to the host machine 433. The host machine 433 has a crypto engine 462 that uses the key 450 to decrypt the packets 481 and 482 for a VM 443, which is running the application 439.

In some embodiments, each edge node is responsible for both negotiating encryption keys as well as handling packet forwarding. In some embodiments, one set of edge nodes is responsible for handling encryption key negotiation, while another set of edge nodes serves as VPN tunnel switch nodes at the perimeter for handling the mapping of the outer tunnel tags to the internal network hosts and for forwarding the packets to the correct host for processing, apart from negotiating the keys for the connection.

Some embodiments negotiate different encryption keys for different L4 connections (also referred to as flows or transport sessions), and each host machines running an applications using one of those L4 connections would use the corresponding flow-specific key to perform encryption. Consequently, each host machine only need to perform VPN decryption/encryption for the L4 connection/session that the host machine is running.

Figure 5:
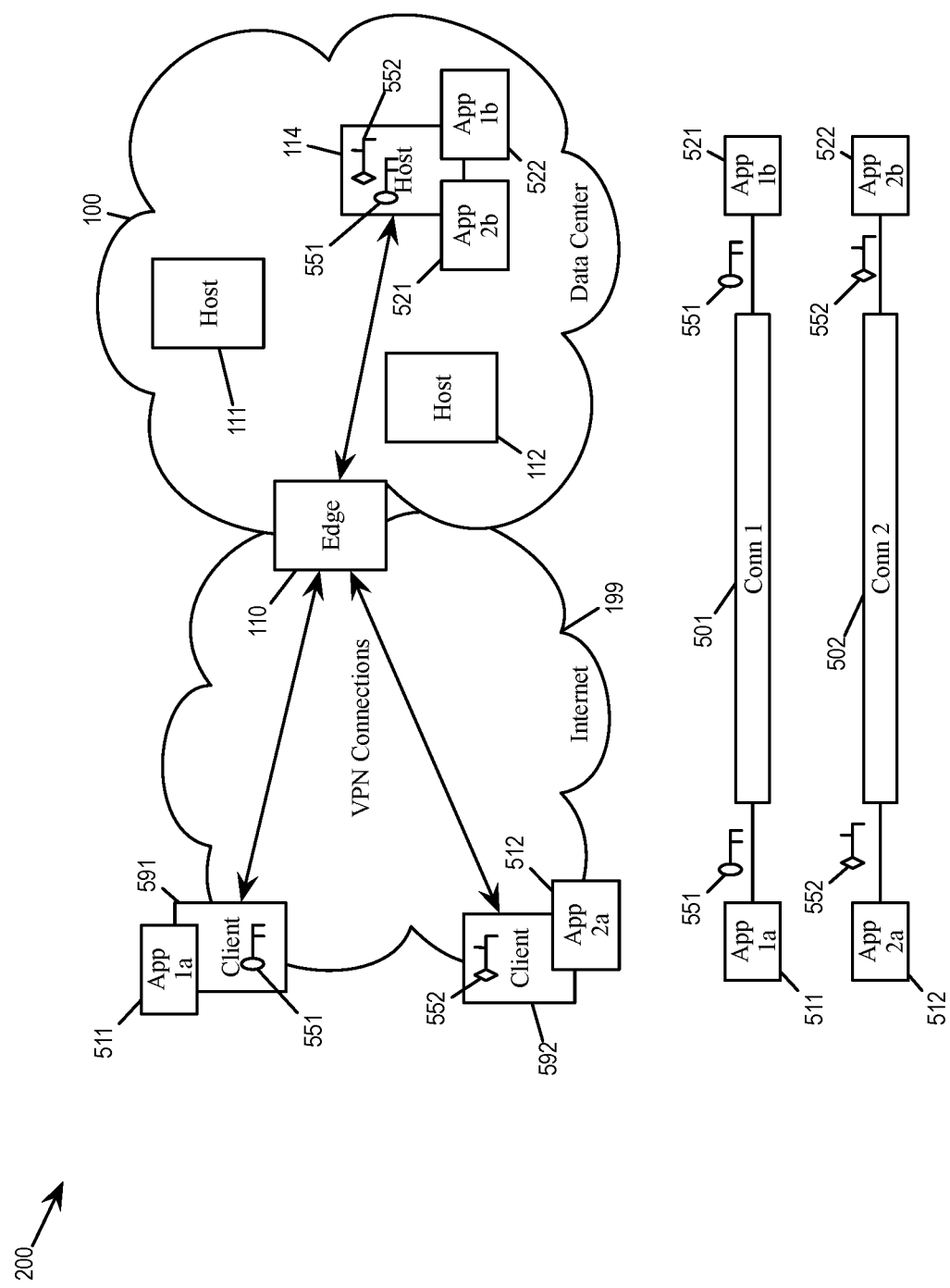
FIG. 5 illustrates an edge node of a data center serving as VPN gateway for different VPN connections.

In some embodiments, one edge node can serve as the VPN gateway for multiple different VPN connections. FIG. 5 illustrates the edge node 110 of the data center 100 serving as VPN gateway for different VPN connections.

II. Encryption Key Distribution

Some embodiments negotiate different encryption keys for different L4 connections (also referred to as flows or transport sessions), and each host machines running an applications using one of those L4 connections would use the corresponding flow-specific key to perform encryption. Consequently, each host machine only need to perform VPN decryption/encryption for the L4 connection/session that the host machine is running.

FIG. 5 illustrates host machines in a SDDC performing flow-specific VPN encryption and decryption. Specifically, the figure illustrates the SDDC 100 having established multiple L4 connections with multiple VPN clients, where different encryption keys encrypt VPN traffic for different flows.

As illustrated, the SDDC 100 has established two L4 connections (or flows) 501 and 502. In some embodiments, each L4 connection is identifiable by a five-tuple identifier of source IP address, destination IP address, source port, destination port, and transport protocol. The L4 connection 501 ("conn 1") is established for transporting data between an application 511 ("app 1a") and an application 521 ("app 1b"). The connection 502 ("conn 2") is established for transporting data between an application 512 ("app 2a") and an application 522 ("app 2b"). The applications 511 is running in a VPN client device 591 and the application 512 is running in a VPN client device 592, while both applications 521 and 522 are running at the host machine 114 of the data center 100.

Since both L4 connections 501 and 502 are inter-site connections that require VPN encryption across the Internet, the VPN gateways of each site has negotiated keys for each of the L4 connections. Specifically, the VPN traffic of L4 connection 501 uses a key 551 for VPN encryption, while the VPN traffic of L4 connection 502 uses a key 552 for VPN encryption.

As the VPN client device 591 is running an application (the application 511) that uses the flow 501, it uses the corresponding key 551 to encrypt/decrypt VPN traffic for the flow 501. Likewise, as the VPN client device 592 is running an application (the application 512) that uses the flow 502, it uses the corresponding key 552 to encrypt/decrypt VPN traffic for the flow 502. The host machine 114 is running applications for both the flows 501 and 502 (i.e., applications 521 and 522). It therefore uses both the key 551 and 552 for encrypting and decrypting VPN traffic (for flows 501 and 502, respectively).

In some embodiments, when multiple different L4 connections are established by VPN, the VPN gateway negotiates a key for each of the flows such that the VPN gateway has keys for each of the L4 connections. In some of these embodiments, these keys are then distributed to the host machines that are running applications that use the corresponding L4 connections. In some embodiments, a host machine obtain the key of a L4 connection from a controller of the datacenter when it query for resolution of destination address (e.g., performing ARP operations for destination IP address.)

Some embodiments distribute encryption keys to the hosts to encrypt/decrypt the complete payload originating/terminating at those hosts. In some embodiments, these encryption keys are created or obtained by the VPN gateway based on network security negotiations with the external networks/devices. In some embodiments, these negotiated keys are then distributed to the hosts via control plane of the network. In some embodiments, this creates a complete distributed mesh framework for processing crypto payloads.

In some embodiments, each edge node (i.e., VPN gateway) is responsible for both negotiating encryption keys as well as handling packet forwarding. In some embodiments, one set of edge nodes is responsible for handling encryption key negotiation, while another set of edge nodes serves as VPN tunnel switch nodes at the perimeter for handling the mapping of the outer tunnel tags to the internal network hosts and for forwarding the packets to the correct host for processing, apart from negotiating the keys for the connection.

Figure 6A:
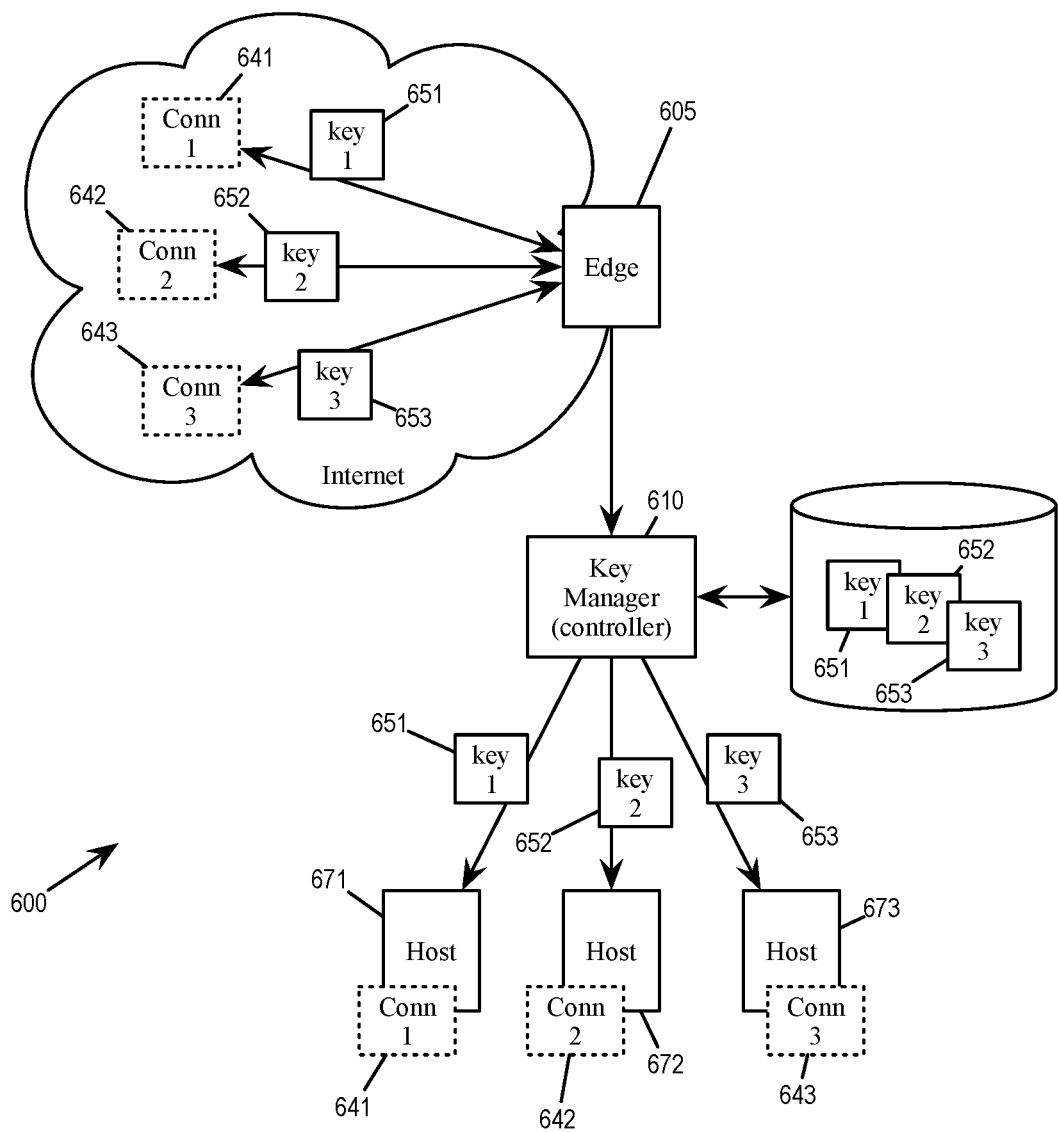
FIGS. 6a-b conceptually illustrate the distribution of VPN encryption keys from an edge to host machines through control plane.
Figure 6B:
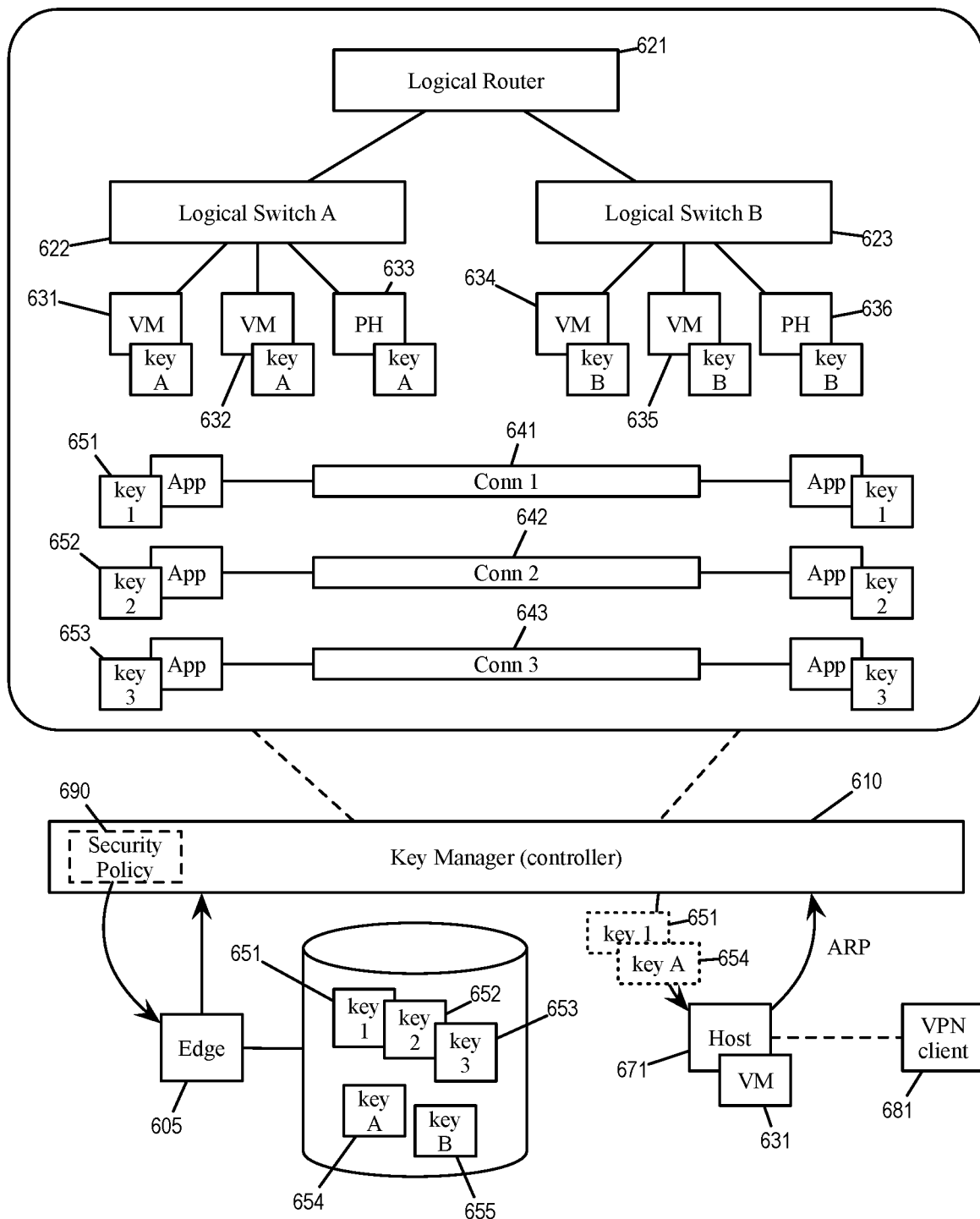

FIGS. 6a-b conceptually illustrate the distribution of VPN encryption keys from an edge to host machines through control plane. The figure illustrates a datacenter 600 having several host machines 671-673 as well as an edge 605 (or multiple edges) that interfaces the Internet and serves as a VPN gateway for the datacenter. The datacenter 600 also has a controller (or a cluster of controllers) 610 for controlling the operations of the host machines 671-673 and the edge 605.

The datacenter 600 is also implementing a logical network 620 that includes a logical router 621 for performing L3 routing as well as logical switches 622 and 623 for performing L2 routing. The logical switch 622 is for performing L2 switching for a L2 segment that includes VMs 631-633. The logical switch 623 is for performing L2 switching for a L2 segment that includes VMs 634-636. In some embodiments, these logical entities are implemented in a distributed fashion across host machines of the datacenter 600. The operations of distributed logical routers and switches, including ARP operations in a virtual distributed router environment, are described in U.S. patent application Ser. No. 14/137,862 filed on Dec. 20, 2013, titled "Logical Router", published as U.S. Patent Application Publication 2015/0106804. The controller 610 controls the host machines of the datacenter 600 in order for those host machines to jointly implement the logical entities 621-623.

As illustrated, the datacenter has several on going L4 connections (flows) 641-643 ("Conn 1", "Conn 2", and "Conn 3"), and the edge 605 has negotiated keys 651-653 for these flows with remote devices or networks external to the datacenter 600. The edge 605 negotiates the keys 651-653 for these flows. In some embodiments, the edge 605 provides these keys to the controller 610, which serves as a key manager and distributes the keys 651-653 to the host machines in the datacenter 600. As illustrated in FIG. 6*a*, the host machines 671-672 are respectively running applications for L4 connections (flows) 641-643, and the controller distributes corresponding keys 651-653 of those flows to the host machines 671-673.

In addition to flow-specific VPN encryption keys, some embodiments also provide keys that are specific to individual L2 segments. In some embodiments, logical switches and logical routers can be global logical entities (global logical switch and global logical routers) that span multiple datacenters. In some embodiments, each global logical switch that spans multiple datacenter can have a VPN encryption key that is specific to its VNI (virtual network identifier, VLAN identifier, or VXLAN identifier for identifying a L2 segment). VMs operating in different sites but belonging to a same L2 segment (i.e., same global logical switch and same VNI) can communicate with each other using VPN connections that are encrypted by a VNI-specific key. As illustrated in FIG. 6*b*, the logical switch 622 (switch A) has a corresponding VPN encryption key 654 (key A) and the logical switch 623 (switch B) has a corresponding VPN encryption key 655 (key B). These keys are also stored at the edge 605 and can be retrieved by host machines that queries for them.

As illustrated, the host machine 671 in the datacenter 600 is controlled by the controller 610 through control plane messages. Depending on the application that it has to run (on the VMs that it is operating), the host machine 671 receives from the controller the corresponding VPN encryption keys. As illustrated, the host machine 671 is in VPN connection with a VPN client device 681 for an application running at its VM 631. Based on this, the host machine 671 queries the key manager 610 for the corresponding keys. The key manager 610 in turn provides the keys 651 and 654.

In some embodiments, the host machine receives encryption keys when it is trying to resolve destination IP addresses during ARP operations. The controller 610 would provide the encryption key to the host machine 671 when the queried destination IP is one that requires VPN encryption (i.e., a destination IP that is in another site separated from the local site). In some embodiments, such a key can be a flow-specific key. In some embodiments, such a key can be a VNI-specific key. In some embodiments, such a key can be specific to the identity of the VPN client.

In some embodiments, each key is negotiated for a policy instance 690 maintained at the controller 610. These policies in some embodiments establishes rules for each flow or for each VNI/L2 segment (e.g., the conditions for rejecting or accepting packets). The controller directs the edge to negotiate the keys based on these policies for certain flows or VNIs.

Some embodiments use Distributed Network Encryption (DNE) to establish a shared key for VPN encryption. DNE is a mechanism for distributed entities in a data center to share a key. The key management is done centrally from an entity called DNE Key Manager, which communicates with DNE Agents in the hypervisors using a secure control channel. The keys are synced between the Agents, which can work then onwards without requiring the DNE Key Manager to be online.

Figure 7:
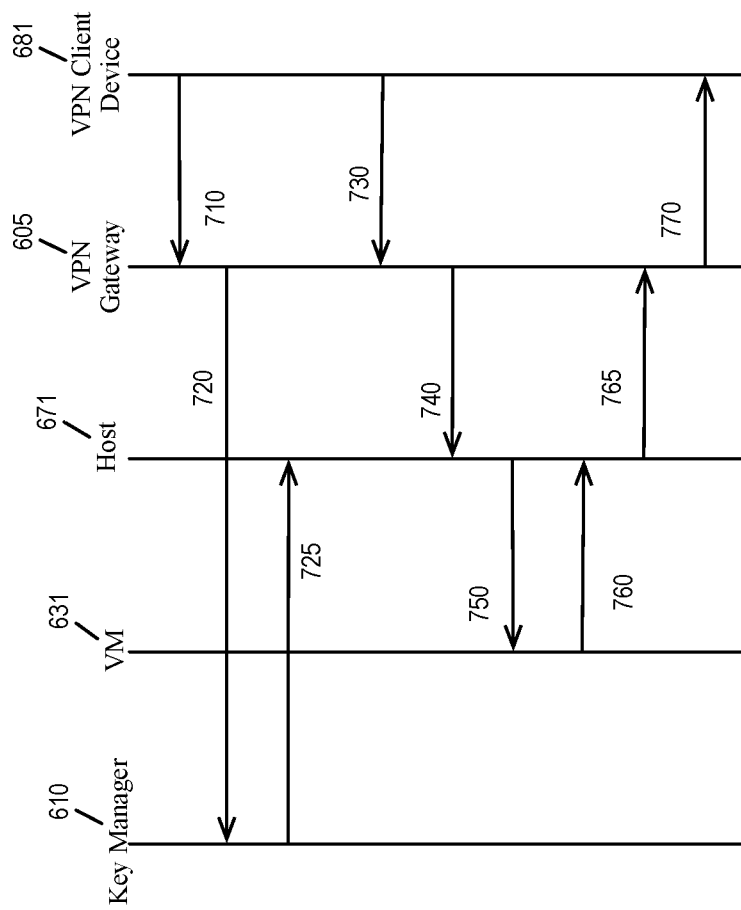
FIG. 7 conceptually illustrates a process for creating and using a VPN session.

For some embodiments, FIG. 7 conceptually illustrates a process for creating and using a VPN session. Specifically, the figure illustrates a sequence of communications 710-770 between the key manager 610, the VM 631, the host 671, the VPN gateway 605, and a VPN client device 681. The VM 631 is operating in the host machine 671. These communications are for creating a VPN session between the VM 631 and the VPN client device 681, in which the VPN gateway 605 negotiated a key with the client device 681 and the key manager provides the negotiated key to the host machine 671.

The communications 710 is for VPN session initiation. The VPN client device 681 initiates a VPN session with the VPN server/gateway 605 via the server's external IP address. The server gives DNS (domain name system) entries to the device. The DNS maps the URLs to the enterprise IP addresses.

The communications 720 and 725 are for establishing a shared key. Some embodiments uses DNE supports establishment of shared keys among the DNE Agents. The VPN server shares the keys with DNE Manager module in the NSX Manager. The DNE Manager in turns shares the keys among the DNE Agents in the Distributed Switches (DS).

The communications 730 shows a packet from the VPN client device 681 to the VPN server 605. The VPN stack on the device encrypts and encapsulates the data, which is destined to the VM 631 in the data center, and sends the encapsulated payload to the VPN server's external IP address. The encapsulation is such that the VPN server 605 can authenticate the payload and find out the VM's IP address.

The communications 740 shows a packet from the VPN server 605 to the host 671 of VM 631. After the VPN server 605 has authenticated the payload, it removes the encapsulation. The VPN server 605 reads the destination IP address and forwards the packet to the VM 631.

The communications 750 shows a packet from the host 671 to the application VM 631. The hypervisor in the host 671 gets the packet and uses DNE to decrypt the packet and send the decrypted packet to the VM 631.

The communications 760 shows a packet from the VM 631 to the host 671. The L2 packet originating from the VM 631 destined to the VPN client device 681 is forwarded to the hypervisor in the host 671. The DNE in the hypervisor encrypts the IP datagram and inserts an authentication header.

The communications 765 shows a packet from the host 671 to the VPN server 605. The L2 packet is forwarded to the VPN server's internal IP address. This packet may be encapsulated in an overlay protocol such as VXLAN on its way to the VPN server. The VPN server de-capsulate the overlay if such encapsulation is applied.

The communications 770 shows a packet from the VPN server 605 to the VPN client device 681. The VPN server 605 encapsulates the L2 payload in another IP packet and sends it to the device over the public IP network (e.g., Internet). The VPN stack in the VPN client device 681 authenticates the packet, removes the encapsulation, decrypts the data, and hands it over to its IP stack.

III. VPN Data Path

As mentioned above, in order to send data packets from its originating application/VM to its destination application/VM through VPN connection and tunnels, the packet has to go through a series of processing operations such as encryption, encapsulation, decryption, and de-capsulation. In some embodiments, when a packet is generated by an application at a VPN client, the VPN client encrypts the packet with VPN encryption key and processes the packet into an IPSec packet with IPSec header. The IPSec packet is then sent through the Internet to the VPN gateway of the datacenter, with the content of the packet encrypted. The VPN gateway of the data center then tunnels the packet to its destination tunnel endpoint (a host machine) by encapsulating it (under overlay such as VXLAN). The host machine that receives the tunnel packet in turn de-capsulate the packet, decrypt the packet, and forward the decrypted data to the destination VM/application.

In some embodiments, a VPN gateway does not perform VPN encryption or decryption. When the VPN gateway receives an encrypted VPN packet over the Internet, it identifies the destination tunnel endpoint (i.e., destination host machine) and the destination VM without decrypting the packet. In some embodiments, the VPN gateway uses information in the IP header to identify destination host machine and destination VM, and the VPN client leaves the IP header unencrypted. In some embodiments, the VPN client encrypt the IP header along with the payload of the packet, but replicates certain portion or fields (e.g., destination IP) of the IP header in an unencrypted portion of the packet so the VPN gateway would be able to forward the packet to its destination in the data center.

Figure 8:
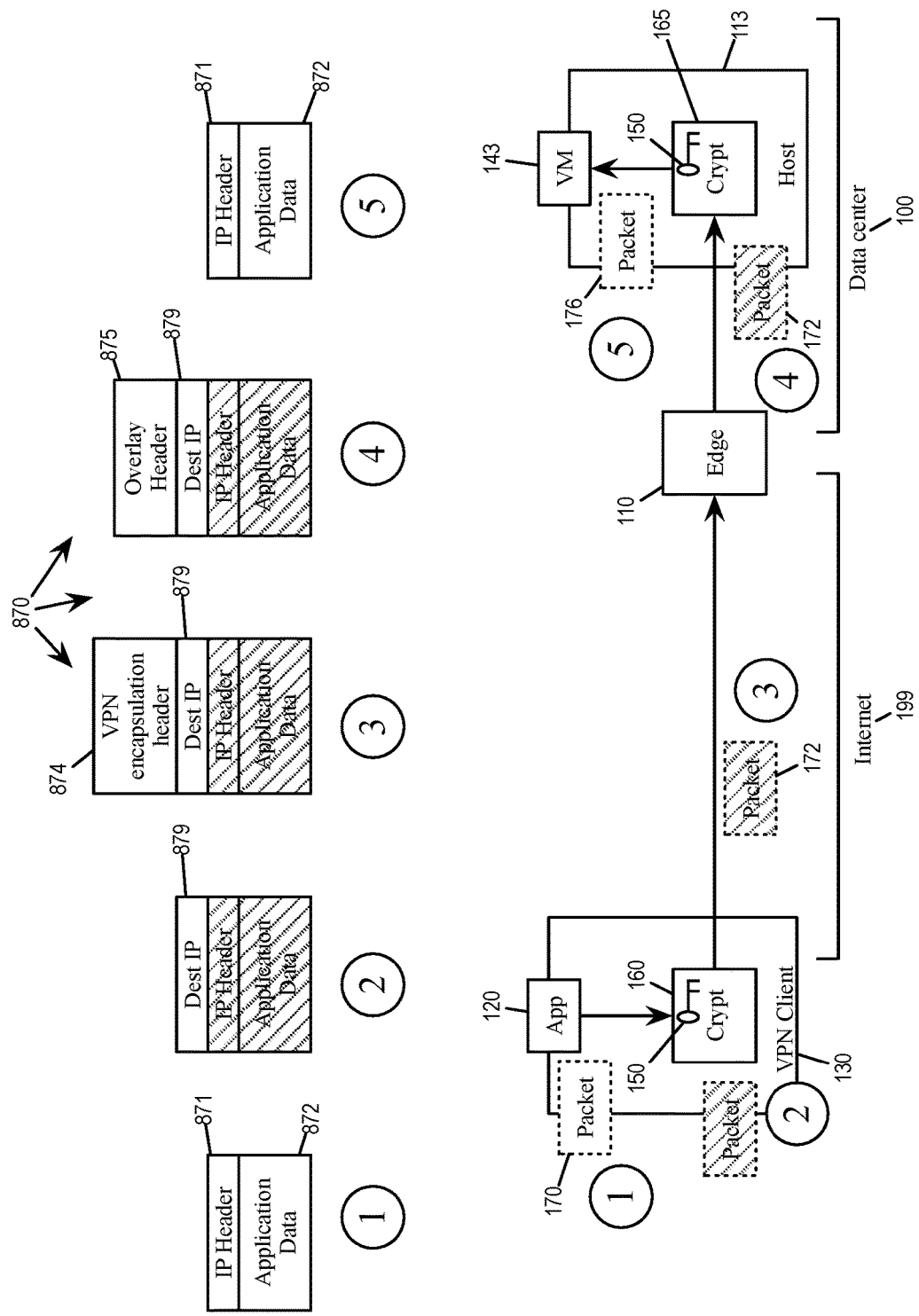
FIG. 8 illustrates packet-processing operations that take place along the VPN connection data path when sending a packet from a VPN client device to a VM operating in a host machine.

For some embodiment, FIG. 8 illustrates packet-processing operations that take place along the VPN connection data path when sending the packet 170 from the VPN client device 130 to the VM 143 operating in the host machine 113. The packet 170 originates at the application 120 of the VPN client device 130, travels through the edge node 110 of the data center 100 to reach the host machine 113 and the VM 143.

The figure illustrates the packet 170 at five sequential stages labeled from '1' through '5'. At the first stage labeled '1', the App 120 produces the packet 170, which includes the application data 872 and IP header 871. In some embodiments, such header can includes destination IP address, source IP addresses, source port, destination port, source MAC address, and destination MAC address.

At the second stage labeled '2', the VPN client 130 has identified the applicable VPN encryption key for the packet 170. In some embodiments, this encryption key is the shared key negotiated by the VPN gateway 110 with the VPN client 130. The VPN client then encrypts the application data 872 along with the IP header 871. However, since the VPN gateway 110 does not perform VPN encryption/decryption at all, the VPN client 130 leaves certain fields of the IP header unencrypted. As illustrated, the VPN client 130 stores destination IP 879 in an unencrypted portion of the packet so the VPN gateway 110 would be able to use the unencrypted destination IP field to forward the packet to its destination without performing VPN decryption.

At the third stage labeled '3', the VPN client 130 creates a VPN encapsulated packet 172 having a VPN encapsulation header 874 for transmission across the Internet. In some embodiments, the VPN encapsulation packet 172 is encapsulated according to a tunneling mechanism over SSL/DTLS or IKE/IPSec. In some embodiments, the VPN encapsulated packet 172 is an IPSec packet and the VPN encapsulation header is an IPSec Tunnel Mode header. In embodiments, the VPN encapsulated packet comprises a SSL header. In some embodiments, the VPN encapsulation header includes an outer TCP/IP header that identifies the external address (or public address) of the VPN gateway 110. The VPN client 130 then sends the VPN encapsulated packet 172 (with the encrypted IP header 871, the encrypted application data 872, unencrypted destination IP 879, and the VPN encapsulation header 874) to the VPN gateway 110 of the data center 100.

At the fourth stage labeled '4', the VPN gateway 110 of the data center 100 receives the VPN encapsulated packet 172. The VPN gateway 110 in turn uses the unencrypted (or exposed) destination IP 879 to identify destination host machine and the destination VM of the packet. No decryption of the packet is performed at the VPN gateway 110. The VPN gateway 110 then creates an overlay header 875 based on the destination IP 879. This overlay header is for encapsulating the packet 170 (with encrypted IP header 871 and encrypted application data 872) for an overlay logical network. In some embodiments, the host machines and the edge gateways of the data center communicates with each other through overlay logical networks such as VXLAN, and each host machine and gateway machine is a tunnel endpoint in the overlay logical network (a tunnel endpoint in a VXLAN is referred to as VTEP). The VPN encapsulation is removed. The edge then tunnels the encapsulated packet to the destination host machine 113.

At the fifth stage labeled '5', the host machine 113 strips off the overlay header 875 and decrypt the packet 170 (i.e., the IP header 871 and the application data 872) for delivery to the destination VM 143.

Figure 9:
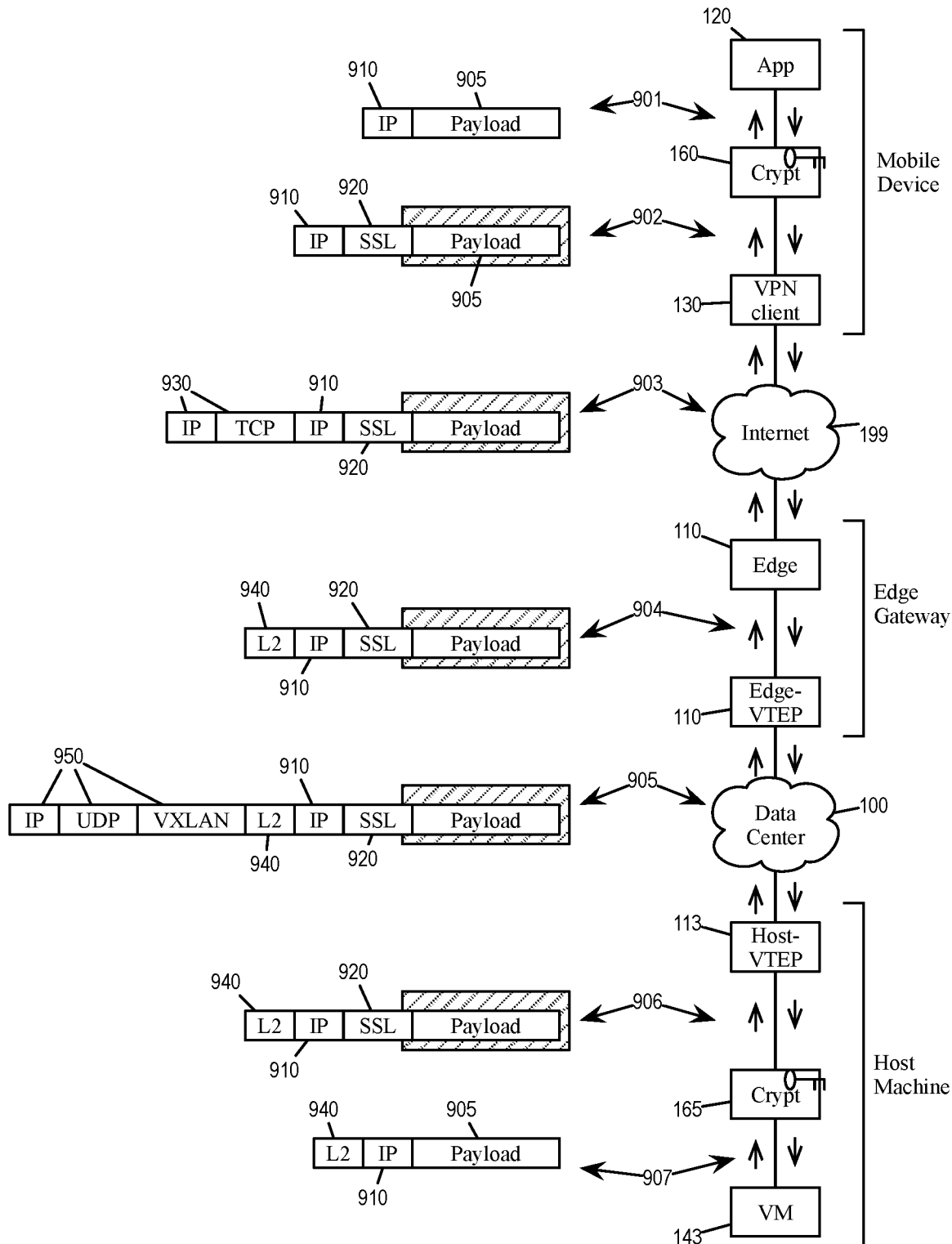
FIG. 9 illustrates the various stages of packet encapsulation and encryption in a distributed tunneling based VPN connection.

For some embodiments, FIG. 9 illustrates the various stages of packet encapsulation and encryption in a distributed tunneling based VPN connection. The figure illustrates seven different stages 901-907 of packet traffic between the App 120 and the VM 143. Each stage shows the structure the packets traversing along the data path.

The stage 901 shows the structure of a packet 971 produced by the app 120 before any encryption and encapsulation. As illustrated, the packet includes payload 905 and IP header 910, both of which are unencrypted.

The stage 902 shows the structure of the packet 971 after the crypto engine 160 has encrypted the packet for VPN. As illustrated, the payload 905 is encrypted and the crypto engine 160 has added an SSL header 920 to the packet. At least a portion of the IP header 910 (e.g., destination IP address) remains unencrypted.

The stage 903 shows the structure of the packet 971 as its is transmitted by the VPN client 130 for the VPN gateway 110. The packet at the stage 903 has an outer TCP/IP header 930 that identifies the external IP address of the VPN gateway. This external IP address is used to forward the packet toward the data center across the Internet. In some embodiments, the outer TCP/IP header is part of a VPN encapsulation header as described by reference to FIG. 8 above.

The stage 904 shows the structure of the packet 971 that has arrived at the VPN gateway 110. The VPN gateway has removed the external TCP/IP header 930 from the packet. The VPN gateway has also created an L2 header 940 based on unencrypted IP address 910. The SSL header 920 and the encrypted payload 905 remain in the packet.

The stage 905 shows the structure of the packet 971 as it is encapsulated by the VPN gateway 110 for transmission over an overlay logical network (e.g., VXLAN). As illustrated, the packet has overlay encapsulation header 950. The overlay encapsulation header identifies the destination host machine 113, which is a tunnel endpoint in the overlay logical network.

The stage 906 shows the structure of the packet 971 after it has arrived at the host machine 113. The host machine 113 as tunnel endpoint (VTEP) removes the encapsulation header 950. The SSL header 920 and the encrypted payload 905 remain in the packet along with L2 header 940 and IP address 910.

The stage 907 shows the structure of the packet after the crypto engine 165 of the host machine 113 has decrypted it. The crypto engine has removed the SSL header 920 as well as decrypted the payload 905. The L2 header 940 and the IP header 940 remains in the packet and are used by the host machine to forward the packet to the VM 143 (through L2 switch and/or L3 router in the hypervisor).

Figure 10:
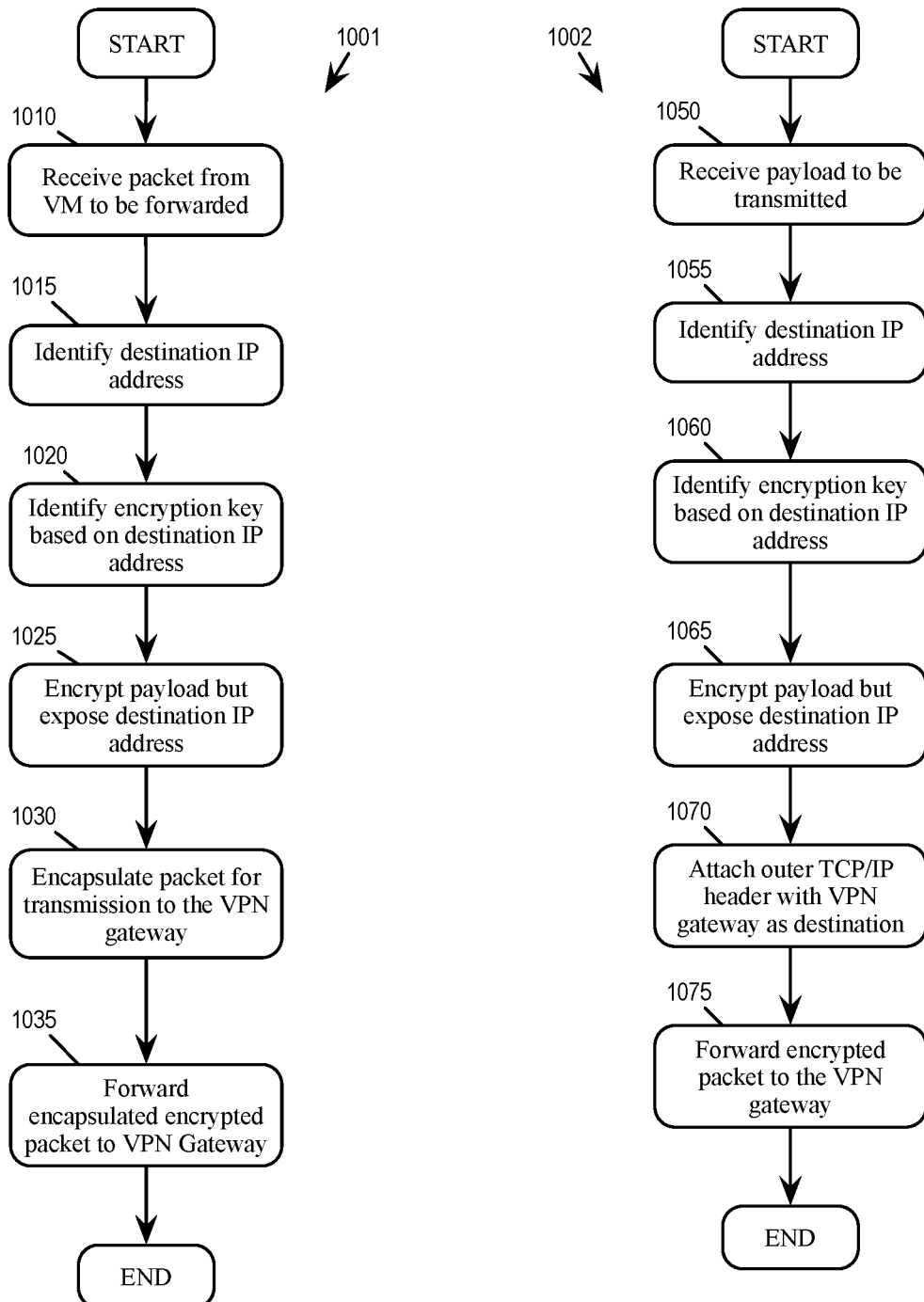
FIG. 10 conceptually illustrates processes for preparing a packet for VPN transmission.

FIG. 10 conceptually illustrates processes 1001 and 1002 for preparing a packet for VPN transmission. Both processes are for sending a packet to a VPN gateway or edge of the data center so the VPN gateway can forward the packet to its destination.

In some embodiments, a host machine performs the process 1001 when sending a packet from a VM in a data center to a VPN client. The process 1001 starts when it receives (at 1010) a packet from a VM.

The process identifies (at 1015) the destination IP address of the packet. The process then identifies (at 1020) an encryption key based on the identified destination IP address. In some embodiments, this encryption key is negotiated by the VPN gateway and distributed by a key manager/controller as described in Section II. The process then encrypts (at 1025) the payload of the packet but leaves the destination IP address unencrypted or exposed. In some embodiments, the process encrypts the entire IP header of the packet but replicates the destination IP address in an unencrypted region of the packet.

The process encapsulates (1030) the packet for transmission to the VPN gateway. In some embodiments, the host machine is a tunnel endpoint in an overlay logical network (e.g., VXLAN), and the process encapsulates the packet according to the overlay logical network in order to forward the packet to the VPN gateway, which is also a tunnel endpoint in the overlay logical network. In some embodiments, the encapsulation identifies the internal address (or private address) of the VPN gateway. The process then forwards (at 1035) the encapsulated packet with encrypted payload to the VPN gateway. The process 1001 then ends.

In some embodiments, a VPN client performs the process 1002 when sending a packet from an app running on the VPN client device to a VM in a data center. The process 1002 starts when it receives (at 1050) payload to be transmitted. In some embodiments, the VPN client receives the payload from an application running on the device that needs to communicate with a corresponding application running in the VM in the data center.

The process identifies (at 1055) the destination IP address of the packet. The process then identifies (at 1060) an encryption key based on the identified destination IP address. In some embodiments, this encryption key is negotiated by the VPN gateway and distributed by a key manager/controller as described in Section II. The process then encrypts (at 1065) the payload of the packet but leaves the destination IP address unencrypted or exposed. In some embodiments, the process encrypts the entire IP header of the packet but replicates the destination IP address in an unencrypted region of the packet.

The process then attaches (at 1070) an outer TCP/IP header to the packet. This header identifies the outer IP address of the VPN gateway as its destination. The process then forwards (at 1075) the encrypted packet toward the VPN gateway (e.g., via the Internet). The process 1002 then ends.

Figure 11:
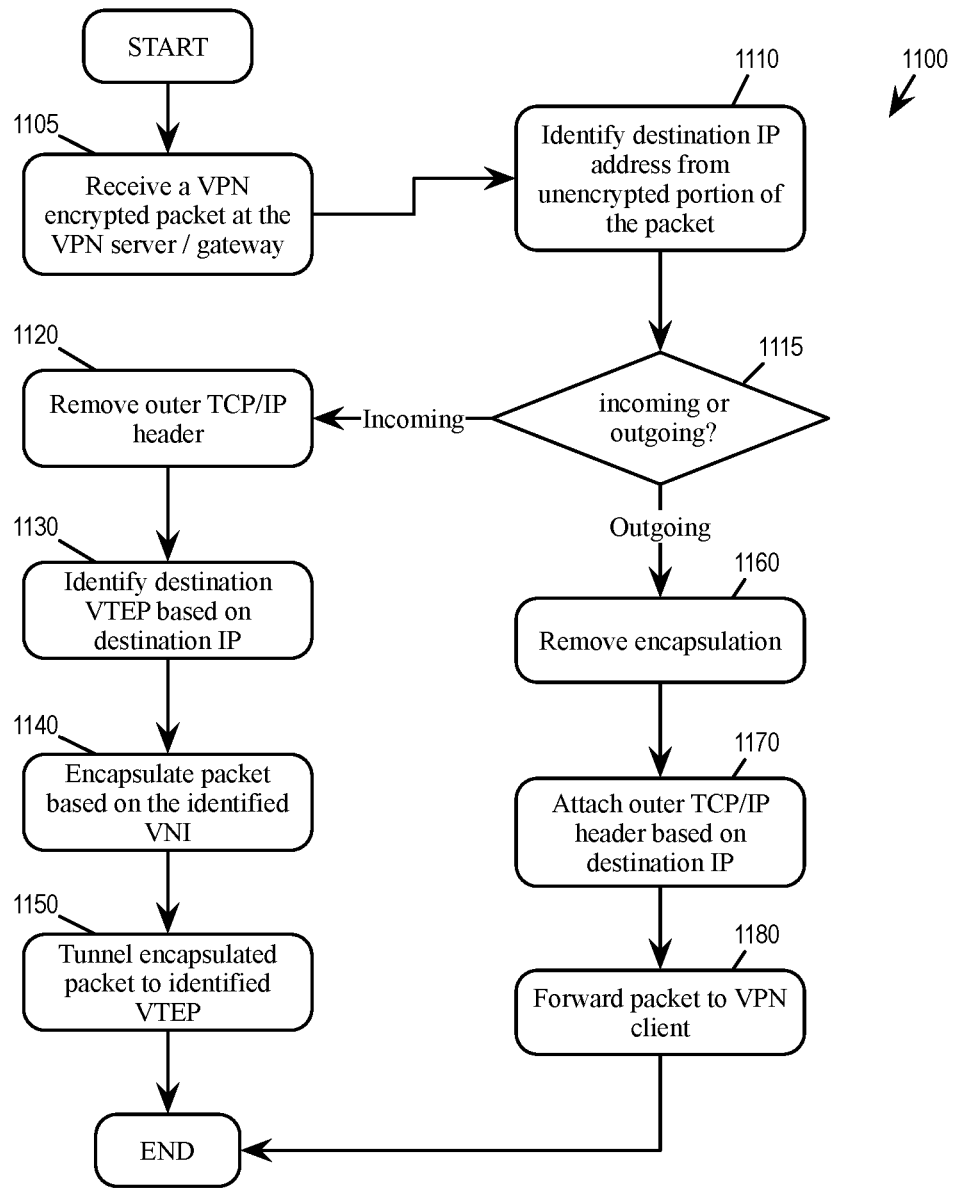
FIG. 11 conceptually illustrates a process for forwarding packet at a VPN gateway of a data center.

FIG. 11 conceptually illustrates a process 1100 for forwarding packet at a VPN gateway of a data center. The process starts when it receives (at 1105) a VPN encrypted packet at the VPN server/gateway, which is an edge node of the data center. In some embodiments, such encryption is according to SSL (secure socket layer) or TLS (transport layer security) protocol.

The process then identifies (at 1110) the destination address from an unencrypted portion of the packet. In some embodiments, the VPN gateway does not perform any VPN encryption or decryption (because encryption and decryption operations are distributed to the host machines hosting the end machines/VMs). The unencrypted destination address allows the VPN gateway to identify the destination of the packet without having to perform any decryption. In some embodiments, the unencrypted destination address is an IP address, and the entire IP header of the packet is unencrypted. In some embodiments, the IP header of the packet is encrypted, but the addresses that are needed for identification of destination (e.g., destination IP) is replicated to an unencrypted portion of the packet.

Next, the process determines (at 1115) whether the VPN encrypted packet is an outgoing packet to a VPN client external to the data center, or an incoming packet to the data center and destined for an application running in a VM hosted by a host machine. Some embodiments make this determination based on the destination address identified from the unencrypted portion of the packet. If the packet is an incoming packet destined for a VM operating in the data center, the process proceeds to 1120. If the packet is an outgoing packet destined for a VPN client external to the data center, the process proceeds to 1160.

At 1120, the process has determined that the VPN encrypted packet is an incoming packet from an external VPN client. The incoming packet has a VPN encapsulation header (including an outer TCP/IP header) identifying an external address (or public address) of the VPN gateway. The process removes the VPN encapsulation header from the packet. The process also identifies (at 1130) the destination endpoint (e.g., VTEP) and the VNI (virtual network identifier) based on the identified destination address. In some embodiments, the VPN gateway has configuration data that associates address of VMs (L2 MAC address or L3 IP address) with VTEP address of corresponding host machines.

The process then encapsulates (at 1140) the packet according to the identified VNI and destination endpoint. The process then tunnels (at 1150) the encapsulated packet to the identified VTEP, which is also the host machine that hosts the destination VM. The process 1100 then ends. Once the packet reaches its destination tunnel endpoint, the host machine strips the encapsulation, decrypt the VPN encryption, and forward the payload to the VM.

At 1160, the process has determined that the VPN encrypted packet is an outgoing packet from a host machine of the data center. The outgoing packet is encapsulated according to an overlay logical network that allows the packet to be tunneled to the VPN gateway. The process then removes the encapsulation. The process also attaches (at 1170) a VPN encapsulation header (including an outer TCP/IP header) based on the identified destination address from the unencrypted portion of the packet. The VPN encapsulation header identifies the VPN client for the destination application. The process then forwards the packet to the VPN client based on the VPN encapsulation header. The process 1100 then ends. Once the packet reaches the destination VPN client, the VPN client device remove the VPN encapsulation header, decrypts the payload and delivers the application data.

IV. Partial Decryption at Edge Node

In some embodiments, the edge of a data center stores VPN encryption keys that it has negotiated. In order to forward packets to their rightful destination within a datacenter, the edge in some embodiments use the negotiated keys to decrypt at least a portion of each incoming VPN encrypted packet to expose the destination of the encrypted packet. This is necessary for some embodiments in which the identity of the destination (e.g., its VNI, MAC address, IP address, etc.) is in the encrypted payload of a VPN encrypted packet. In some of these embodiments, the edge uses information in the header of the VPN encrypted packet to identify the corresponding decryption key and then use the identified key to decrypt and reveal the destination information of the packet.

Figure 12:
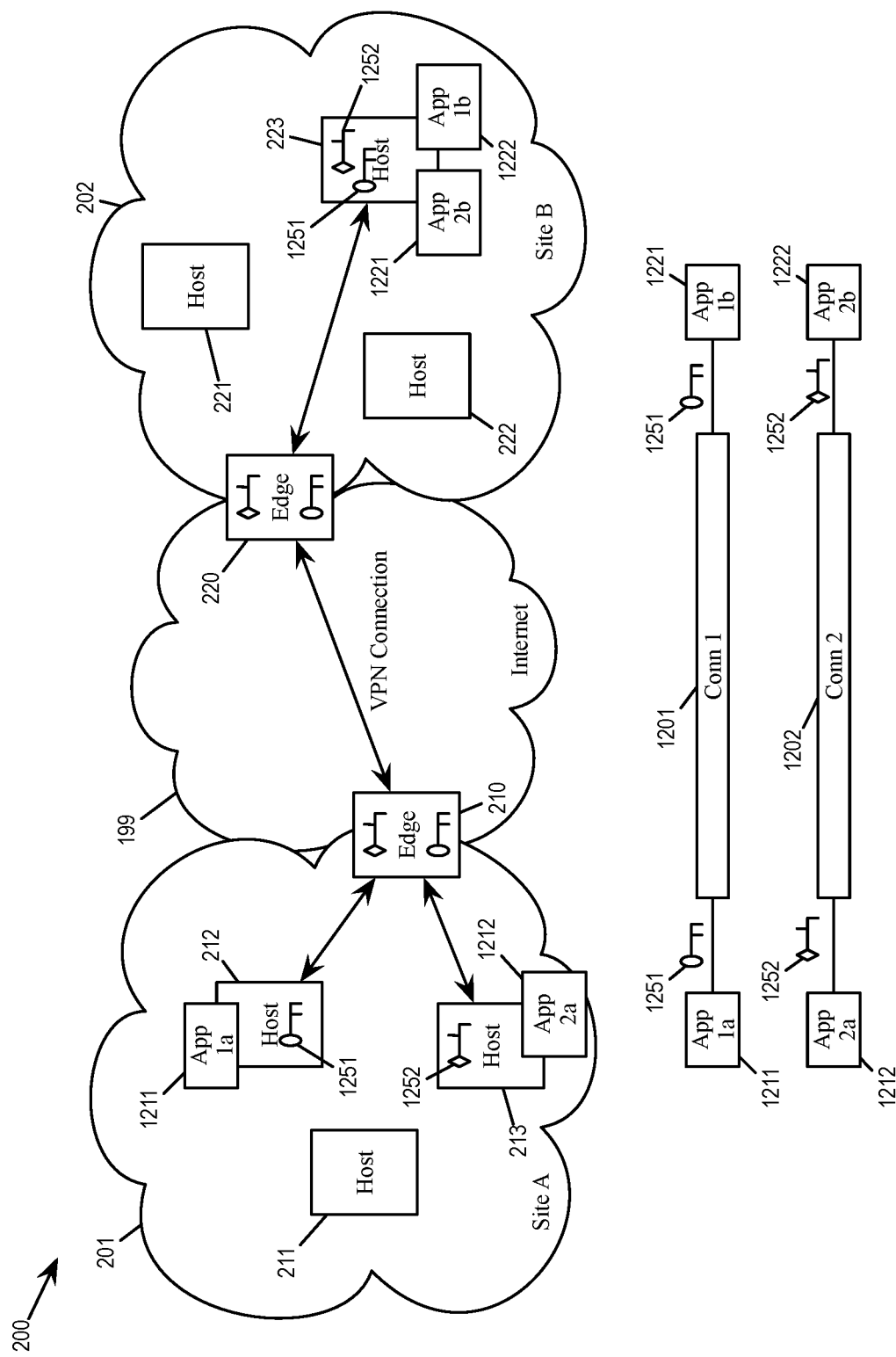
FIG. 12 illustrates host machines in multi-site environment performing flow-specific VPN encryption and decryption.

FIG. 12 illustrates host machines in multi-site environment performing flow-specific VPN encryption and decryption. Specifically, the figure illustrates a multi-site environment having established multiple L4 connections across different sites using VPN, where different encryption keys encrypt VPN traffic for different flows.

As illustrated, the multi-site environment 200 has established two L4 connections (or flows) 1201 and 1202. In some embodiments, each L4 connection is identifiable by a five-tuple identifier of source IP address, destination IP address, source port, destination port, and transport protocol. The L4 connection 1201 ("conn 1") is established for transporting data between an application 1211 ("app 1*a*") and an application 1221 ("app 1*b*"). The connection 1202 ("conn 2") is established for transporting data between an application 1212 ("app 2*a*") and an application 1222 ("app 2*b*"). The applications 1211 is running in the host machine 212 and the application 1212 is running in the host machine 213, while both applications 1221 and 1222 are running in site B at the host machine 223.

Since both L4 connections 1201 and 1202 are inter-site connections that require VPN encryption across the Internet, the VPN gateways of each site has negotiated keys for each of the L4 connections. Specifically, the VPN traffic of L4 connection 1201 uses a key 1251 for VPN encryption, while the VPN traffic of L4 connection 1202 uses a key 1252 for VPN encryption.

As the host machine 212 is running an application (the application 1211) that uses the flow 1201, it uses the corresponding key 1251 to encrypt/decrypt VPN traffic for the flow 1201. Likewise, as the host machine 213 is running an application (the application 1212) that uses the flow 1202, it uses the corresponding key 1252 to encrypt/decrypt VPN traffic for the flow 1202. The host machine 223 is running applications for both the flows 1201 and 1202 (i.e., applications 1221 and 1222). It therefore uses both the key 1251 and 1252 for encrypting and decrypting VPN traffic (for flows 1201 and 1202, respectively).

As mentioned, VPN encryption keys are generated based on the negotiation between the VPN gateways (i.e., edge nodes of datacenters/sites). In some embodiments, when multiple different L4 connections are established by VPN, the VPN gateway negotiates a key for each of the flows such that the VPN gateway has keys for each of the L4 connections. In some of these embodiments, these keys are then distributed to the host machines that are running applications that use the corresponding L4 connections. In some embodiments, a host machine obtain the key of a L4 connection from a controller of the datacenter when it query for resolution of destination address (e.g., performing ARP operations for destination IP address.) In some embodiments, a VPN gateway that negotiated a key also keeps a copy of the key for subsequent partial decryption of packets for identifying the destination of the packet within the data center.

Figure 13:
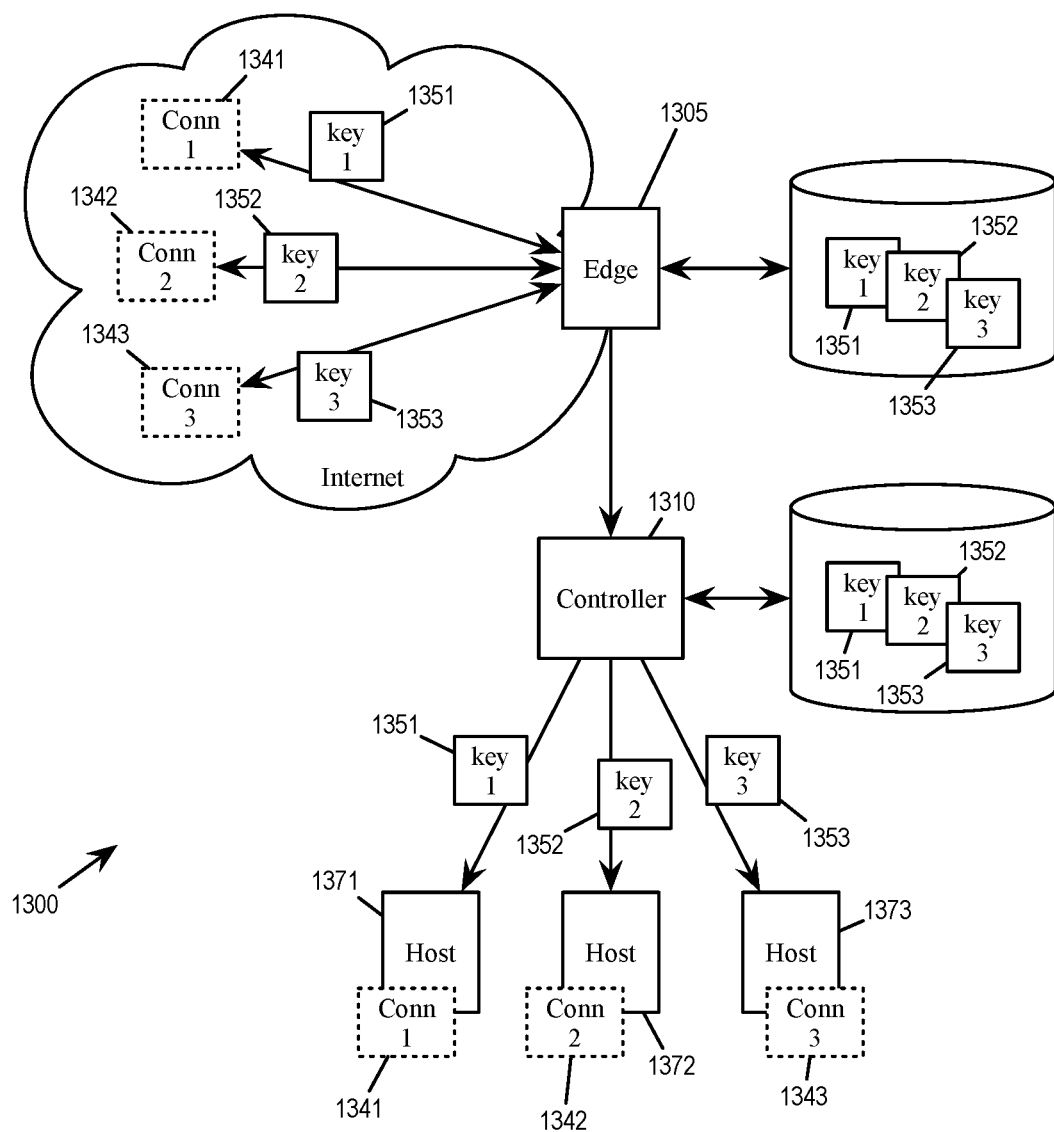
FIG. 13 conceptually illustrate the distribution of VPN encryption keys from an edge to host machines through control plane.

FIG. 13 conceptually illustrate the distribution of VPN encryption keys from an edge to host machines through control plane. The figure illustrates a datacenter 1300 having several host machines 1371-1373 as well as an edge 1305 (or multiple edges) that interfaces the Internet and serves as a VPN gateway for the datacenter. The datacenter 1300 also has a controller (or a cluster of controllers) 1310 for controlling the operations of the host machines 1371-1373 and the edge 1305.

The datacenter 1300 is also implementing a logical network 1320 that includes a logical router 1321 for performing L3 routing as well as logical switches 1322 and 1323 for performing L2 routing. The logical switch 1322 is for performing L2 switching for a L2 segment that includes VMs 1331-1333. The logical switch 1323 is for performing L2 switching for a L2 segment that includes VMs 1334-1336. In some embodiments, these logical entities are implemented in a distributed fashion across host machines of the datacenter 1300. The controller 1310 controls the host machines of the datacenter 1300 in order for those host machines to jointly implement the logical entities 1321-1323.

As illustrated, the datacenter has several on going L4 connections (flows) 1341-1343 ("Conn 1", "Conn 2", and "Conn 3"), and the edge 1305 has negotiated keys 1351-1353 for these flows with remote devices or networks external to the datacenter 1300. The edge 1305 negotiates the keys 1351-1353 for these flows and stores the negotiated keys 1351-1353 at the edge 1305. In some embodiments, these keys are distributed to those host machines by the controller 1310. As illustrated in FIG. 13, the host machines 1371-1372 are respectively running applications for L4 connections (flows) 1341-1343, and the controller distributes corresponding keys 1351-1353 of those flows to the host machines 1371-1373.

Figure 14:
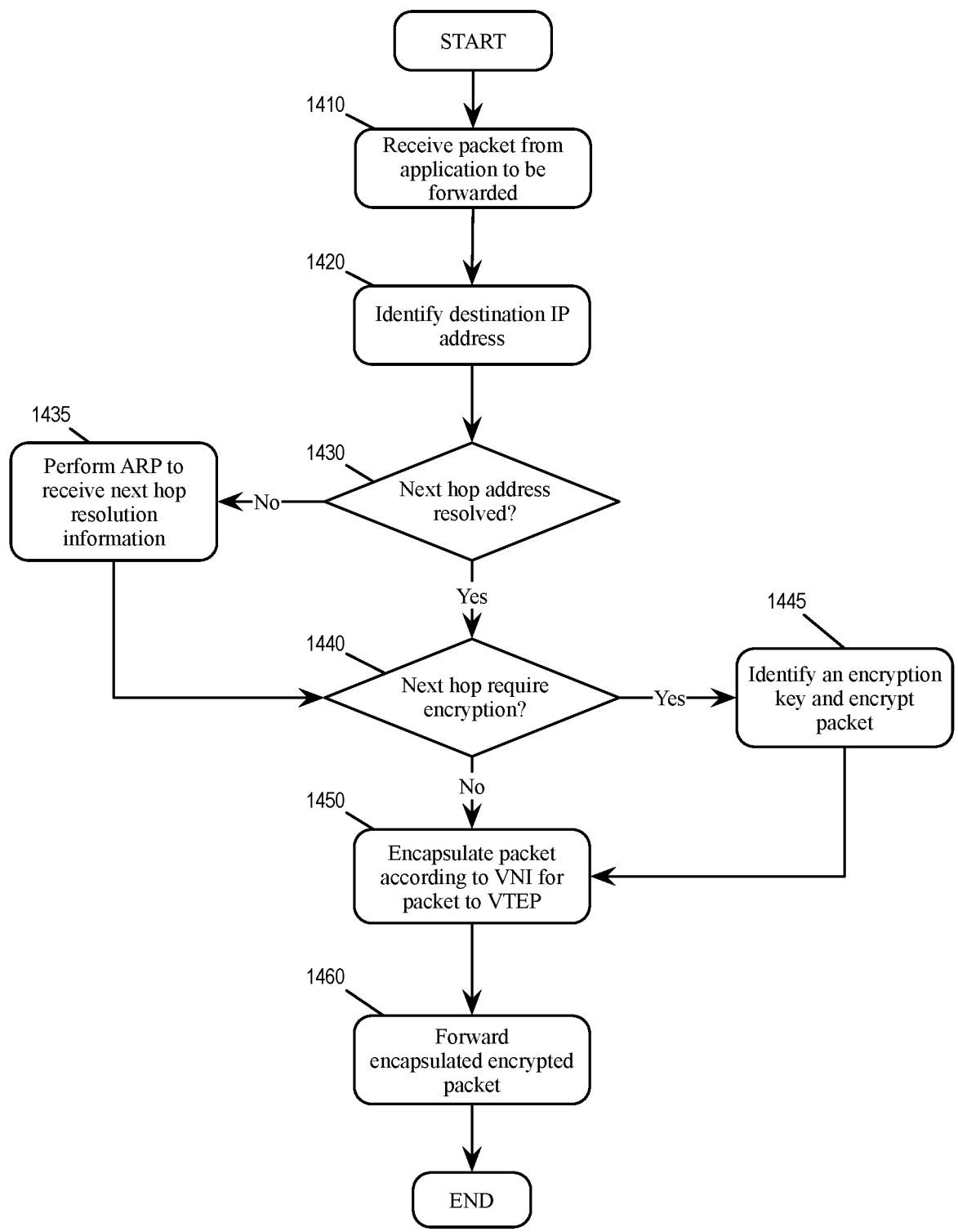
FIG. 14 conceptually illustrates a process that is performed by a host machine in a datacenter that uses VPN to communicate with external network or devices.

For some embodiments, FIG. 14 conceptually illustrates a process 1400 that is performed by a host machine in a datacenter that uses VPN to communicate with external network or devices. The process 1400 starts when it receives (at 1410) an outgoing packet to be forwarded from an application running on a VM.

The process then identifies (at 1420) the destination IP address of the outgoing packet and determines (at 1430) whether the destination IP address need to be resolved, i.e., whether the next hop based on the destination IP address is known. In some embodiments, the next hop is identified by its VNI and MAC address. In some embodiments, the next hop is behind a virtual tunnel and the packet is to be forwarded according to a tunnel endpoint address (VTEP), which can corresponds to another host machine or physical router in the network. If the next hop address is already resolved, the process proceeds to 1440. If the next hop address is not resolved, the process proceeds to 1435.

At 1435, the process performs ARP in order to receive the necessary address resolution information from the controller. Such information in some embodiments includes the VNI, the MAC address, and/or the VTEP of next hop. In some embodiments, such information also includes VPN encryption key if the data is to be transmitted via a VPN connection. In some embodiments, such information includes a remote network's topology using host tags so that the secure overlay traffic travels directly to host machines in the remote networks where the workload is located. The process then proceeds to 1440.

At 1440, the process determines if VPN encryption is necessary for the next hop. Some embodiments make this determination based on the earlier ARP response from 1435, which informs the process whether packet has to be encrypted for VPN and provides a corresponding key if encryption is necessary. Some embodiments make this determination based on security policy or rules applicable to the packet. If the VPN encryption is necessary, the process proceeds to 1445. Otherwise the process proceeds to 1450.

At 1445, the process identifies the applicable VPN encryption key and encrypts the packet. In some embodiments, the host machine may operate multiple VMs having applications requiring different encryption keys (e.g., for packets belonging to different flows or different L2 segments.) The process would thus use information in packet (e.g., L4 flow identifier or L2 segment identifier) to identify the correct corresponding key. The process then proceeds to 1450.

At 1450, the process encapsulates the (encrypted) packet according to the resolved next hop information (i.e., the destination VTEP, MAC address, and VNI) so the packet can be tunneled to its destination. The process then forwards (at 1460) the encapsulated packet to its destination, i.e., to the edge so the edge can forward the packet to the external device through the Internet. After forwarding the encapsulated packet, the process 1400 ends.

As mentioned above by reference to FIGS. 1 and 2, in order to send data packets from its originating application/VM to its destination application/VM through VPN connection and tunnels, the packet has to go through a series of processing operations such as encryption, encapsulation, decryption, and de-capsulation. In some embodiments, when a packet is generated by an application at a particular datacenter or site, the host machine running the application encrypts the packet with VPN encryption key and then encapsulates the packet (using overlay such as VXLAN) in order to tunnel the to the edge. The edge in turn processes the packet into an IPSec packet with IPSec header. The IPSec packet is then sent through the Internet to another datacenter or site, with the content of the packet encrypted. The edge of the other site then tunnels the packet to its destination tunnel endpoint (a host machine) by encapsulating it (under overlay such as VXLAN). The host machine that receives the tunnel packet in turn de-capsulate the packet, decrypt the packet, and forward the decrypted data to the destination VM/application. In some embodiments, the edge of the other site uses its stored negotiated keys to decrypt a portion of the packet in order to identify the destination tunnel endpoint in that other site.

Figure 15:
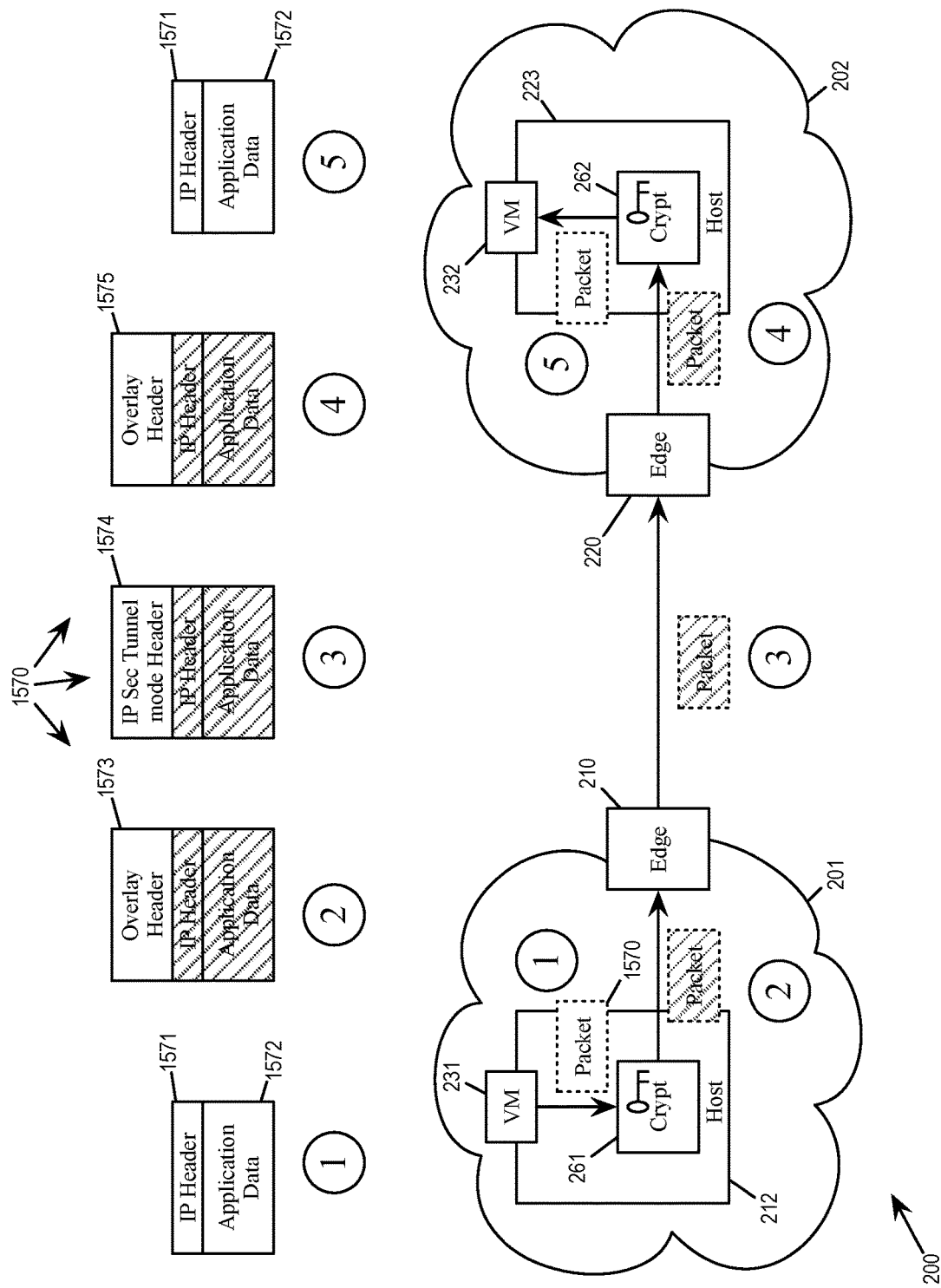
FIG. 15 illustrates packet-processing operations that take place along the data path when sending a packet from one site to another site by using VPN.

For some embodiment, FIG. 15 illustrates packet-processing operations that take place along the data path when sending a packet 1570 from one site (the site 201) to another site (the site 202) by using VPN. The packet 1570 originates at the VM 231 of the host machine 212, travels through the edge node 210 of site 201 and the edge node 220 of the site 202 to reach the host machine 223 and the VM 232.

The figure illustrates the packet 1570 at five sequential stages labeled from '1' through '5'. At the first stage labeled '1', the VM 231 produces the packet 1570, which includes the application data 1571 and IP header data 1572. In some embodiments, such header can includes destination IP address, source IP addresses, source port, destination port, source MAC address, and destination MAC address. The packet 1570 is not encrypted at operation '1'. In some embodiments, the information in the IP header refers to topologies of the source datacenter (i.e., the site 201) that the security policy of the datacenter may not want to reveal, and hence the subsequent VPN encryption operations will encrypt the IP header as well as the application data.

At the second stage labeled '2', the host machine 212 has identified the applicable VPN encryption key for the packet 1500 based on the content of the IP header 1571 (e.g., by identifying the flow/L4 connection or by identifying the VNI/L2 segment). The host machine then encrypted the IP header 1571 and well as the application data 1572 (shown in hash). Furthermore, based on the information of the IP header 1571, the host machine has encapsulated the packet 1570 for an overlay logical network (e.g., VXLAN) with an overlay header 1573 in order to tunnel the packet to the edge 210 of site 201.

At the third stage labeled '3', the edge 210 receives the tunneled packet and strips off the overlay header 1573. The edge then creates an IPSec packet for transmission across the Internet. The IPSec packet includes an IPSec Tunnel Mode header 1574 that is based on the information in the stripped off overlay header 1573. This IPSec header 1574 includes information that can be used to identify the VPN encryption key (e.g., in the SPI field of the IPSec header). The edge 210 then sends packet 1570 (with the encrypted IP header 1571, the encrypted application data 1572, and their corresponding IPSec Tunnel Mode header 1573) toward the edge 220 of the site 202.

At the fourth stage labeled '4', the edge 220 of the site 202 uses the information in the IPSec Tunnel Mode header to 1573 to identify the key used for the encryption and decrypt enough of the IP header 1571 in order to create an overlay header 1575. This overlay header is for encapsulating the packet 1570 (with encrypted IP header 1571 and encrypted application data 1572) for an overlay logical network (e.g., VXLAN). The edge then tunnels the encapsulated packet to the host machine 223.

At the fifth stage labeled '5', the host machine 223 strips off the overlay header 1575 and decrypt the packet 1570 (i.e., the IP header 1571 and the application data 1572) for delivery to the destination VM 232.

As mentioned, the encryption keys used by the host machines to encrypt and decrypt VPN traffic are edge-negotiated keys. The edge as VPN gateway negotiates these keys according to security policies of the tenant or the logical network that is using the VPN connection, specific to a L4 connection or a L2 segment (logical switch). The controller then distributes negotiated keys to the host machines so the host machine performs the actual encryption and decryption. The edge is in turn tasked with forwarding the incoming encrypted VPN traffic to their rightful destinations.

However, in order to forward packets to their rightful destination within a datacenter, the edge in some embodiments nevertheless has to use the negotiated keys to decrypt at least a portion of each incoming VPN encrypted packet in order to reveal the destination of the encrypted packet. This is necessary for some embodiments in which the identity of the destination (e.g., its VNI, MAC address, IP address, etc.) is in encrypted payload of a VPN encrypted packet. In some of these embodiments, the edge uses information in the header of the VPN encrypted packet to identify the corresponding decryption key and then use the identified key to decrypt and reveal the destination information of the packet.

Figure 16:
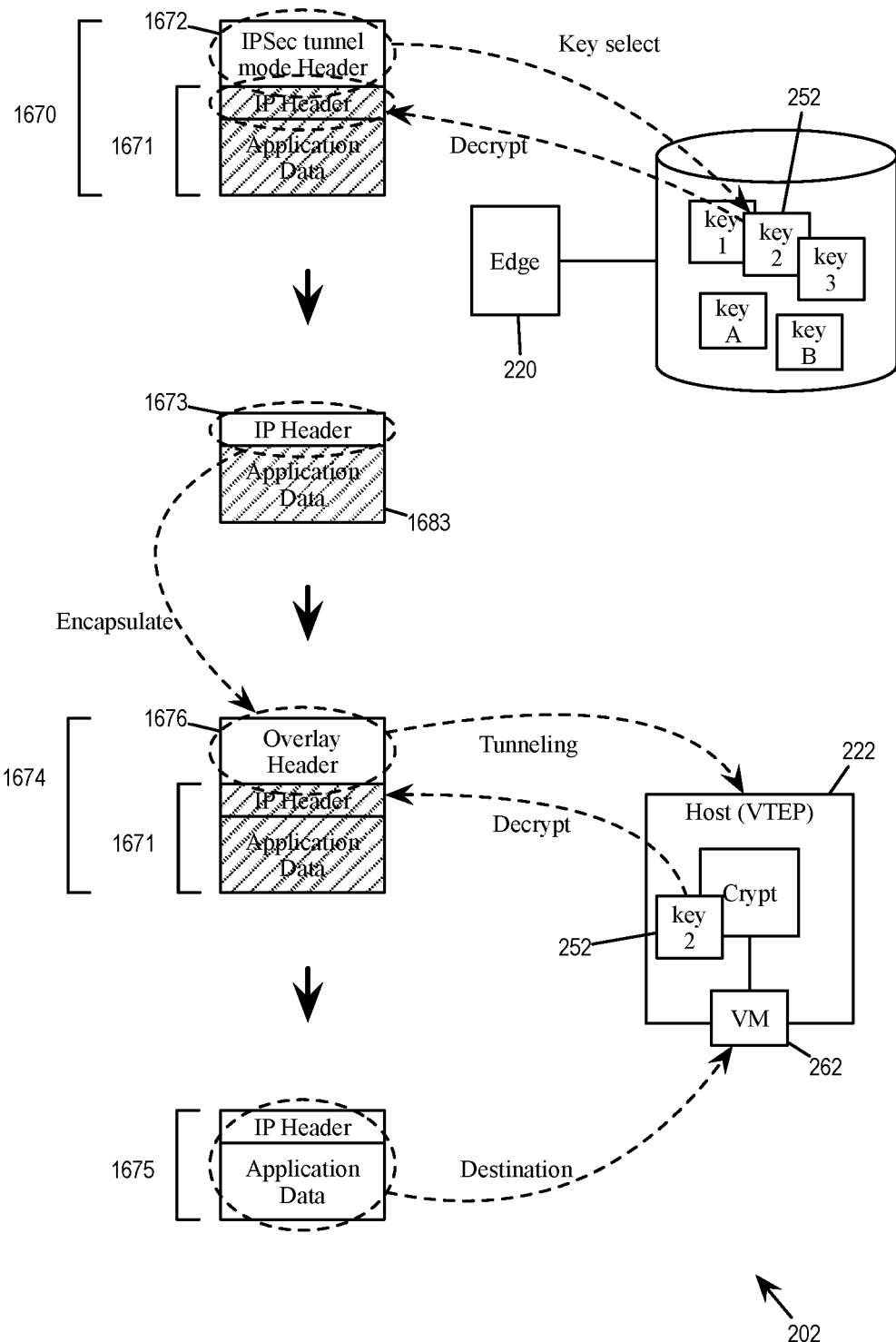
FIG. 16 illustrates using partial decryption of the VPN encrypted packet to identify the packet's rightful destination.

FIG. 16 illustrates using partial decryption of the VPN encrypted packet to identify the packet's rightful destination. The figure illustrates the forwarding of a VPN encrypted packet 1670 by the edge 220 of the datacenter 202. The received VPN encrypted packet 1670 is an IPSec packet arriving at the edge 220 from the Internet from another datacenter. As the packet 1670 arrives at the edge 220, it has an encrypted payload 1671 and an unencrypted IPSec header 1672. The payload 1671 includes both IP header 1673 and application data 1683.

Since the header 1672 of the IPSec is an IPSec tunnel mode header that is not encrypted, it can be read directly by the edge 220. The IPSec tunnel mode header 1672 includes field that identifies the flow or L4 connection that the packet 1670 belongs to. In some embodiments in which the VPN encrypted packet is an IPSec packet, the SPI field of the IPSec header provides the identity of the flow. The edge 220 in turn uses the identity of the flow provided by the IPSec header to select/identify a corresponding encryption key 252.

The edge 220 in turn uses the identified key 252 to decrypt a portion of the encrypted payload 1671 of the packet 1670, revealing the first few bytes (e.g., the header portion) 1673 of the payload. In some embodiment, the edge 220 would halt the decryption operation once these first few bytes are revealed in some embodiments. Based on the revealed bytes, the edge determines the identity of the destination and encapsulates the encrypted payload 1671 into an encapsulated packet 1674 by adding an overlay header 1676. In some embodiments, this encapsulation is for tunneling in overlay logical network such as VXLAN. The encapsulated packet 1674 is tunneled to the destination host machine 222.

Once the encapsulated packet 1674 reaches the host machine 222, the host machine uses the VPN encryption key 252 to decrypt the encrypted payload 1671. If the host machine 222 does not have the key, it would perform an ARP like operation and queries the controller for the key based on either the VNI or the destination IP. The decryption results in a decrypted payload 1675, which is provided to the destination VM 262.

Figure 17:
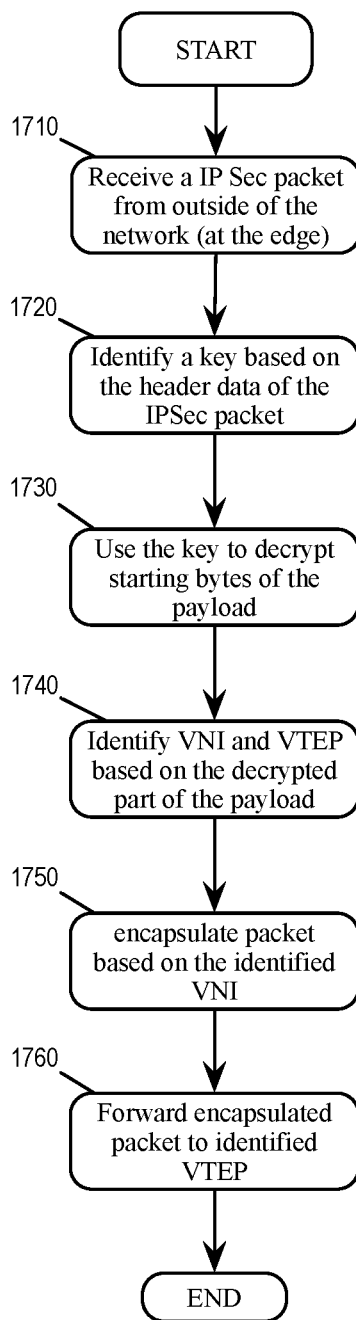
FIG. 17 conceptually illustrates a process for forwarding VPN encrypted packet at an edge node.

For some embodiments, FIG. 17 conceptually illustrates a process 1700 for forwarding VPN encrypted packet at an edge node. In some embodiments, the process 1700 is performed by an edge of the datacenter such as the edge node 220.

The process 1700 starts when it receives (at 1710) a packet from outside of the network/datacenter. In some embodiments, the payload of this packet is encrypted based on a VPN encryption key. In some embodiments, the packet is an IPSec packet.

Next, the process identifies (1720) a VPN encryption key based on the header data of the packet. In some embodiments in which the packet is an IPSec packet, the header of the IPSec packet is not encrypted. Such a packet header in some embodiments includes information that can be used to identify VPN encryption key. In some embodiments, these indication includes the flow/L4 connection of the IPSec packet. Consequently, the process is able to identify the encryption key based on the indication provided by the header by e.g., using the flow identifier of the IPSec packet to identify the corresponding VPN encryption key.

The process then uses (1730) the identified key to decrypt the starting bytes of the encrypted payload in order to reveal these bytes to the edge node. In some embodiments, the starting bytes of the encrypted payload include information that can be used to determine the next hop after the edge node, information such as destination IP address, destination VNI, destination VTEP, destination MAC address, etc. The process then uses the decrypted bytes to identify (at 1740) the next hop information. In some embodiments, the process performs L3 routing operations based on the information in the revealed bytes (e.g., destination IP address) in order to identify the destination VNI, destination VTEP, or next hop MAC.

Next, the process encapsulates (1750) packets based on the identified VNI. In some embodiments, the encrypted payload of the IPSec is encapsulated under VXLAN format based on the earlier identified information (e.g., destination VNI and VTEP).

The process then forwards (1760) the encapsulated packet to the identified destination (e.g., a host machine as the VTEP). The process 1700 then ends.

V. Computing Device and Virtualization Software

Figure 18:
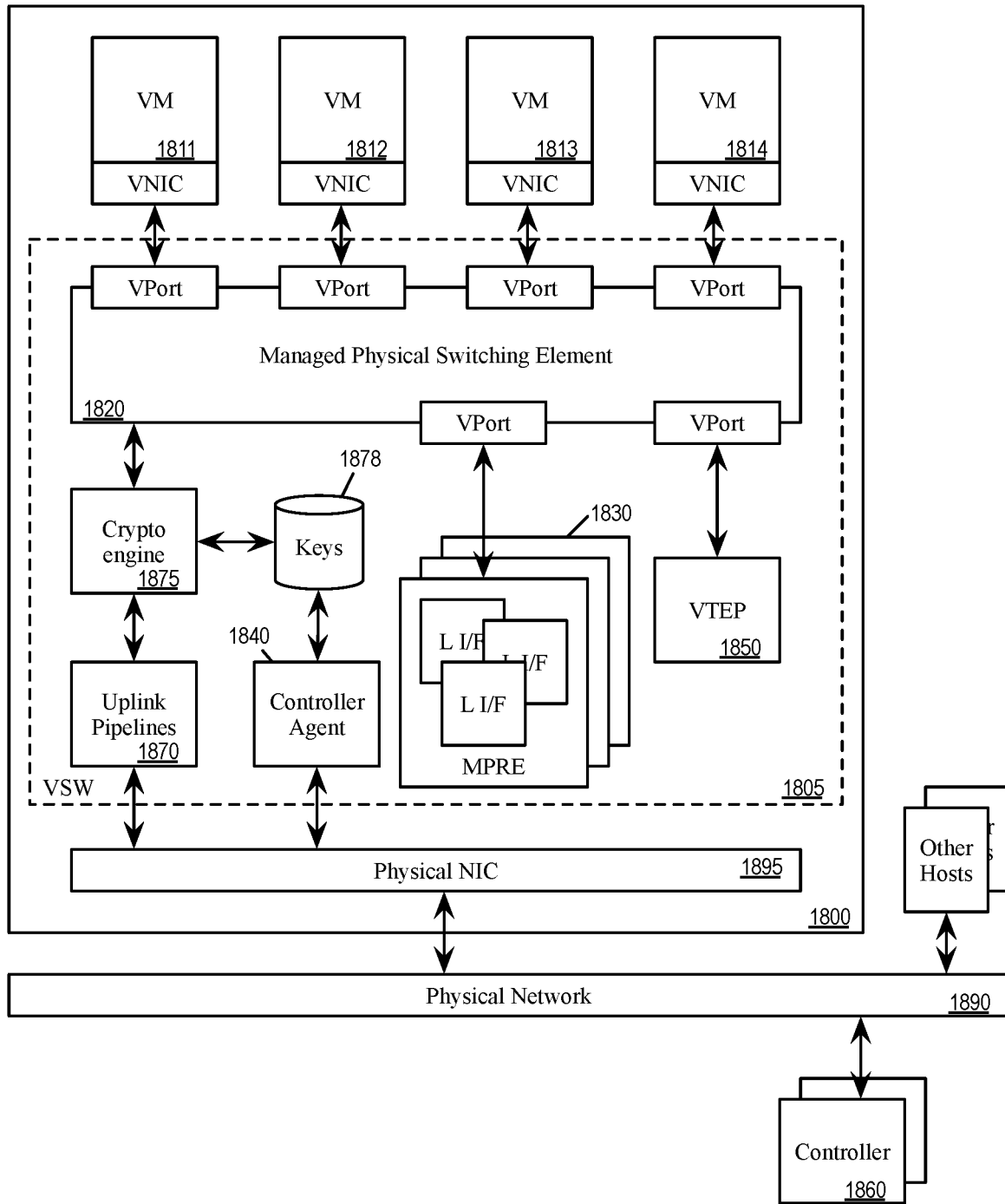
FIG. 18 illustrates a computing device that serves as a host machine.

FIG. 18 illustrates a computing device 1800 that serves as a host machine or edge gateway (i.e., VPN gateway or VPN server) for some embodiments of the invention. The computing device 1800 is running virtualization software that implements a physical switching element and a set of physical routing elements. (i.e., MPSE and MPREs).

As illustrated, the computing device 1800 has access to a physical network 1890 through a physical NIC (PNIC) 1895. The host machine 1800 also runs the virtualization software 1805 and hosts VMs 1811-1814. The virtualization software 1805 serves as the interface between the hosted VMs and the physical NIC 1895 (as well as other physical resources, such as processors and memory). Each of the VMs includes a virtual NIC (VNIC) for accessing the network through the virtualization software 1805. Each VNIC in a VM is responsible for exchanging packets between the VM and the virtualization software 1805. In some embodiments, the VNICs are software abstractions of physical NICs implemented by virtual NIC emulators.

The virtualization software 1805 manages the operations of the VMs 1811-1814, and includes several components for managing the access of the VMs to the physical network (by implementing the logical networks to which the VMs connect, in some embodiments). As illustrated, the virtualization software includes several components, including a MPSE 1820, a set of MPREs 1830, a controller agent 1840, a VTEP 1850, a crypto engine 1875, and a set of uplink pipelines 1870.

The VTEP (VXLAN tunnel endpoint) 1850 allows the host machine 1800 to serve as a tunnel endpoint for logical network traffic (e.g., VXLAN traffic). VXLAN is an overlay network encapsulation protocol. An overlay network created by VXLAN encapsulation is sometimes referred to as a VXLAN network, or simply VXLAN. When a VM on the host 1800 sends a data packet (e.g., an ethernet frame) to another VM in the same VXLAN network but on a different host, the VTEP will encapsulate the data packet using the VXLAN network's VNI and network addresses of the VTEP, before sending the packet to the physical network.

The packet is tunneled through the physical network (i.e., the encapsulation renders the underlying packet transparent to the intervening network elements) to the destination host. The VTEP at the destination host decapsulates the packet and forwards only the original inner data packet to the destination VM. In some embodiments, the VTEP module serves only as a controller interface for VXLAN encapsulation, while the encapsulation and decapsulation of VXLAN packets is accomplished at the uplink module 1870.

The controller agent 1840 receives control plane messages from a controller or a cluster of controllers. In some embodiments, these control plane message includes configuration data for configuring the various components of the virtualization software (such as the MPSE 1820 and the MPREs 1830) and/or the virtual machines. In the example illustrated in FIG. 18, the controller agent 1840 receives control plane messages from the controller cluster 1860 from the physical network 1890 and in turn provides the received configuration data to the MPREs 1830 through a control channel without going through the MPSE 1820. However, in some embodiments, the controller agent 1840 receives control plane messages from a direct data conduit (not illustrated) independent of the physical network 1890. In some other embodiments, the controller agent receives control plane messages from the MPSE 1820 and forwards configuration data to the router 1830 through the MPSE 1820. In some embodiments, the controller agent 1840 also serve as the DNE agent of the host machine, responsible for receiving VPN encryption keys from a key manager (which can be the controller). Distribution of encryption keys under DNE is described by reference to FIG. 14 above.

The MPSE 1820 delivers network data to and from the physical NIC 1895, which interfaces the physical network 1890. The MPSE also includes a number of virtual ports (vPorts) that communicatively interconnects the physical NIC with the VMs 1811-1814, the MPREs 1830 and the controller agent 1840. Each virtual port is associated with a unique L2 MAC address, in some embodiments. The MPSE performs L2 link layer packet forwarding between any two network elements that are connected to its virtual ports. The MPSE also performs L2 link layer packet forwarding between any network element connected to any one of its virtual ports and a reachable L2 network element on the physical network 1890 (e.g., another VM running on another host). In some embodiments, a MPSE is a local instantiation of a logical switching element (LSE) that operates across the different host machines and can perform L2 packet switching between VMs on a same host machine or on different host machines. In some embodiments, the MPSE performs the switching function of several LSEs according to the configuration of those logical switches.

The MPREs 1830 perform L3 routing on data packets received from a virtual port on the MPSE 1820. In some embodiments, this routing operation entails resolving L3 IP address to a next-hop L2 MAC address and a next-hop VNI (i.e., the VNI of the next-hop's L2 segment). Each routed data packet is then sent back to the MPSE 1820 to be forwarded to its destination according to the resolved L2 MAC address. This destination can be another VM connected to a virtual port on the MPSE 1820, or a reachable L2 network element on the physical network 1890 (e.g., another VM running on another host, a physical non-virtualized machine, etc.).

As mentioned, in some embodiments, a MPRE is a local instantiation of a logical routing element (LRE) that operates across the different host machines and can perform L3 packet forwarding between VMs on a same host machine or on different host machines. In some embodiments, a host machine may have multiple MPREs connected to a single MPSE, where each MPRE in the host machine implements a different LRE. MPREs and MPSEs are referred to as "physical" routing/switching element in order to distinguish from "logical" routing/switching elements, even though MPREs and MPSE are implemented in software in some embodiments. In some embodiments, a MPRE is referred to as a "software router" and a MPSE is referred to a "software switch". In some embodiments, LREs and LSEs are collectively referred to as logical forwarding elements (LFEs), while MPREs and MPSEs are collectively referred to as managed physical forwarding elements (MPFEs).

In some embodiments, the MPRE 1830 includes one or more logical interfaces (LIFs) that each serves as an interface to a particular segment (L2 segment or VXLAN) of the network. In some embodiments, each LIF is addressable by its own IP address and serve as a default gateway or ARP proxy for network nodes (e.g., VMs) of its particular segment of the network. In some embodiments, all of the MPREs in the different host machines are addressable by a same "virtual" MAC address (or vMAC), while each MPRE is also assigned a "physical" MAC address (or pMAC) in order indicate in which host machine does the MPRE operate.

The crypto engine 1875 applies encryption key to decrypt incoming data from the physical network and to encrypt outgoing data to the physical network 1890. In some embodiments, a controller sends the encryption key to the virtualization software 1805 through control plane messages, and the crypto engine 1875 identifies a corresponding key from among the received keys for decrypting incoming packets and for encrypting outgoing packets. In some embodiments, the controller agent 1840 receives the control plane messages, and the keys delivered by the control plane messages is stored in a key store 1878 that can be accessed by the crypto engine 1875.

The uplink module 1870 relays data between the MPSE 1820 and the physical NIC 1895. The uplink module 1870 includes an egress chain and an ingress chain that each performs a number of operations. Some of these operations are pre-processing and/or post-processing operations for the MPRE 1830. The operations of LIFs, uplink module, MPSE, and MPRE are described in U.S. patent application Ser. No. 14/137,862 filed on Dec. 20, 2013, titled "Logical Router", published as U.S. Patent Application Publication 2015/0106804.

As illustrated by FIG. 18, the virtualization software 1805 has multiple MPREs for multiple different LREs. In a multi-tenancy environment, a host machine can operate virtual machines from multiple different users or tenants (i.e., connected to different logical networks). In some embodiments, each user or tenant has a corresponding MPRE instantiation of its LRE in the host for handling its L3 routing. In some embodiments, though the different MPREs belong to different tenants, they all share a same vPort on the MPSE 1820, and hence a same L2 MAC address (vMAC or pMAC). In some other embodiments, each different MPRE belonging to a different tenant has its own port to the MPSE.

The MPSE 1820 and the MPRE 1830 make it possible for data packets to be forwarded amongst VMs 1811-1814 without being sent through the external physical network 1890 (so long as the VMs connect to the same logical network, as different tenants' VMs will be isolated from each other). Specifically, the MPSE performs the functions of the local logical switches by using the VNIs of the various L2 segments (i.e., their corresponding L2 logical switches) of the various logical networks. Likewise, the MPREs perform the function of the logical routers by using the VNIs of those various L2 segments. Since each L2 segment/L2 switch has its own a unique VNI, the host machine 1800 (and its virtualization software 1805) is able to direct packets of different logical networks to their correct destinations and effectively segregates traffic of different logical networks from each other.

VI. Electronic Device

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 19:
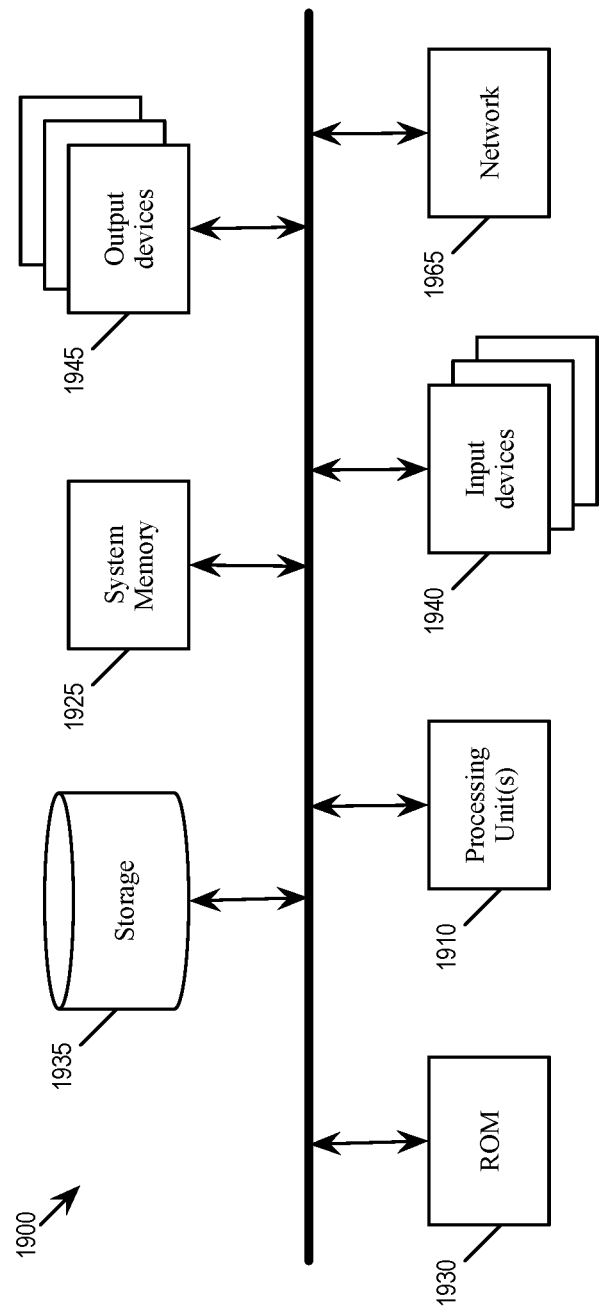
FIG. 19 conceptually illustrates an electronic system with which some embodiments of the invention are implemented.

FIG. 19 conceptually illustrates an electronic system 1900 with which some embodiments of the invention are implemented. The electronic system 1900 can be used to execute any of the control, virtualization, or operating system applications described above. The electronic system 1900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1900 includes a bus 1905, processing unit(s) 1910, a system memory 1925, a read-only memory 1930, a permanent storage device 1935, input devices 1940, and output devices 1945.

The bus 1905 collectively represents all system, peripheral, and chipset buses that communicatively connect the numerous internal devices of the electronic system 1900. For instance, the bus 1905 communicatively connects the processing unit(s) 1910 with the read-only memory 1930, the system memory 1925, and the permanent storage device 1935.

From these various memory units, the processing unit(s) 1910 retrieves instructions to execute and data to process in order to execute the processes of the invention. The processing unit(s) may be a single processor or a multi-core processor in different embodiments.

The read-only-memory (ROM) 1930 stores static data and instructions that are needed by the processing unit(s) 1910 and other modules of the electronic system. The permanent storage device 1935, on the other hand, is a read-and-write memory device. This device is a non-volatile memory unit that stores instructions and data even when the electronic system 1900 is off. Some embodiments of the invention use a mass-storage device (such as a magnetic or optical disk and its corresponding disk drive) as the permanent storage device 1935.

Other embodiments use a removable storage device (such as a floppy disk, flash drive, etc.) as the permanent storage device. Like the permanent storage device 1935, the system memory 1925 is a read-and-write memory device. However, unlike storage device 1935, the system memory is a volatile read-and-write memory, such a random access memory. The system memory stores some of the instructions and data that the processor needs at runtime. In some embodiments, the invention's processes are stored in the system memory 1925, the permanent storage device 1935, and/or the read-only memory 1930. From these various memory units, the processing unit(s) 1910 retrieves instructions to execute and data to process in order to execute the processes of some embodiments.

The bus 1905 also connects to the input and output devices 1940 and 1945. The input devices enable the user to communicate information and select commands to the electronic system. The input devices 1940 include alphanumeric keyboards and pointing devices (also called "cursor control devices"). The output devices 1945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 19, bus 1905 also couples electronic system 1900 to a network 1965 through a network adapter (not shown). In this manner, the computer can be a part of a network of computers (such as a local area network ("LAN"), a wide area network ("WAN"), or an Intranet, or a network of networks, such as the Internet. Any or all components of electronic system 1900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD-RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 10, 11, and 14) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. For facilitating virtual private network (VPN) connections, a method for forwarding a packet from a logical network that is defined over a physical network of a datacenter to a VPN client outside of the datacenter through a particular VPN connection between a host computer inside of the datacenter and the VPN client outside of the datacenter, the method comprising:

receiving, at a computing device in the datacenter, a packet comprising an encapsulating first outer header and a payload, the encapsulating first outer header storing a logical network identifier that identifies the logical network to which the packet is associated, and the payload of the packet comprising an unencrypted portion and an encrypted portion that was encrypted by the host computer for the particular VPN connection with the VPN client;

identifying, from said unencrypted portion of the encapsulated payload, a network address of the VPN client outside of the datacenter as a destination of the received packet;

replacing the encapsulating first outer header of the packet with an encapsulating second outer VPN header for the particular VPN connection, the second outer VPN header specifying the identified network address of the VPN client as the destination address of the packet; and forwarding the packet with the encapsulating second outer VPN header to the VPN client outside of the datacenter, wherein the VPN client decapsulates the packet and decrypts the encrypted portion of the payload of the packet.

2. The method of claim 1, wherein said computing device is an edge node of the datacenter that comprises a plurality of host computers executing machines connected to the logical network.

3. The method of claim 2, wherein the received encapsulated packet is tunneled to the computing device from the host computer, wherein the host computer and the computing device are tunnel endpoints of an overlay logical network.

4. The method of claim 3, wherein the computing device is a VPN gateway that negotiated with the VPN client for an encryption key that is used to encrypt the encrypted portion of the packet, wherein the encryption key is provided to the host computer for encrypting the packet.

5. The method of claim 1, wherein the encapsulating first outer header is a header added to the packet when the packet is sent by a machine executing on the host computer in order to produce the received encapsulated packet, the packet further comprising a first header storing network addresses defined for the logical network, said encapsulating first outer header allowing the packet to traverse through the physical network of the datacenter while preserving network addresses defined for the logical network.

6. A non-transitory machine readable medium storing a program for facilitating virtual private network (VPN) connections by forwarding a packet from a logical network that is defined over a physical network of a datacenter to a VPN client outside of the datacenter through a particular VPN connection between a host computer inside of the datacenter and the VPN client outside of the datacenter, the program for execution by at least one processing unit of a computing device, the program comprising sets of instructions for:

receiving, at a computing device in the datacenter, a packet comprising an encapsulating first outer header and a payload, the encapsulating first outer header storing a logical network identifier that identifies the logical network to which the packet is associated, and the payload of the packet comprising an unencrypted portion and an encrypted portion that was encrypted by the host computer for the particular VPN connection with the VPN client;

identifying, from said unencrypted portion of the encapsulated payload, a network address of the VPN client outside of the datacenter as a destination of the received packet;

replacing the encapsulating first outer header of the packet with an encapsulating second outer VPN header for the particular VPN connection, the second outer VPN header specifying the identified network address of the VPN client as the destination address of the packet; and forwarding the packet with the encapsulating second outer VPN header to the VPN client outside of the datacenter, wherein the VPN client decapsulates the packet and decrypts the encrypted portion of the payload of the packet.

7. The non-transitory machine readable medium of claim 6, wherein said computing device is an edge node of the datacenter that comprises a plurality of host computers executing machines connected to the logical network.

8. The non-transitory machine readable medium of claim 7, wherein the received encapsulated packet is tunneled to the computing device from the host computer, wherein the host computer and the computing device are tunnel endpoints of an overlay logical network.

9. The non-transitory machine readable medium of claim 8, wherein the computing device is a VPN gateway that negotiated with the VPN client for an encryption key that is used to encrypt the encrypted portion of the packet, wherein the encryption key is provided to the host computer for encrypting the packet.

10. The non-transitory machine readable medium of claim 6, wherein the encapsulating first outer header is a header added to the packet when the packet is sent by a machine executing on the host computer in order to produce the received encapsulated packet, the packet further comprising a first header storing network addresses defined for the logical network, said encapsulating first outer header allowing the packet to traverse through the physical network of the datacenter while preserving network addresses defined for the logical network.

\* \* \* \* \*